United States Patent
Labrie et al.

(10) Patent No.: US 6,955,376 B1
(45) Date of Patent: *Oct. 18, 2005

(54) APPARATUS FOR DEPLOYING AN AIR BAG THROUGH A HARD PANEL

(75) Inventors: Craig B. Labrie, Dover, NH (US); Edwin V. Stawicki, Highland, MI (US); Nelson J. Morren, Hudsonville, MI (US); John J. Kennedy, Royal Oak, MI (US); Vernon A. Daniels, Brooklyn, MI (US); Jimmy C. Rogers, Berwick, ME (US); John D. Gray, Union, NH (US); Bruce A. Batchelder, Lee, NH (US); Michael J. Gallagher, Manchester, NH (US); Richard D. Rhodes, Jr., Somersworth, NH (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/786,305

(22) PCT Filed: Jun. 16, 1999
(Under 37 CFR 1.47)

(86) PCT No.: PCT/US99/13592

§ 371 (c)(1),
(2), (4) Date: May 6, 2002

(87) PCT Pub. No.: WO99/65738

PCT Pub. Date: Dec. 23, 1999

Related U.S. Application Data

(63) Continuation-in-part of application No. 08/949,842, filed on Oct. 14, 1997, now Pat. No. 5,941,558, which is a continuation-in-part of application No. 08/871,243, filed on Jun. 9, 1997, now abandoned.

(60) Provisional application No. 60/089,836, filed on Jun. 19, 1998, provisional application No. 60/089,863, filed on Jun. 19, 1998.

(51) Int. Cl.$^7$ .............................................. B60R 21/20
(52) U.S. Cl. .................................. 280/728.3; 280/732
(58) Field of Search ........................... 280/728.3, 732, 280/728.2, 730.1, 730.2, 752, 728.1

(56) References Cited

U.S. PATENT DOCUMENTS

| 4,893,833 A | 1/1990 | DiSalvo et al. ............. 280/732 |
| 5,031,930 A | 7/1991 | Sato .......................... 280/732 |
| 5,035,444 A | 7/1991 | Carter ........................ 280/732 |
| 5,162,092 A | 11/1992 | Klobucar et al. ........... 264/513 |
| 5,342,085 A | 8/1994 | Hirashima et al. ...... 280/728 B |
| 5,395,668 A | 3/1995 | Ito et al. ....................... 428/43 |
| 5,472,228 A | 12/1995 | Bentley et al. .......... 280/728.3 |
| 5,533,746 A | 7/1996 | Whited .................... 280/728.2 |
| 5,564,731 A | 10/1996 | Gallagher et al. ....... 280/728.3 |
| 5,569,959 A | 10/1996 | Cooper et al. ........... 280/728.3 |
| 5,738,367 A | 4/1998 | Zichichi et al. .......... 280/728.3 |

FOREIGN PATENT DOCUMENTS

| DE | 197 35 438 | 2/1999 | .......... B60R 21/02 |
| EP | 0 722 863 | 7/1996 | .......... B60R 21/20 |
| FR | 2 649 945 | 1/1991 | .......... B60R 21/20 |
| JP | 5-185896 | 7/1993 | .......... B60R 21/20 |
| JP | 6-227351 | 8/1994 | .......... B60R 21/20 |
| JP | 7-246900 | 9/1995 | .......... B60R 21/20 |
| JP | 9-240404 | 9/1997 | .......... B60R 21/16 |
| WO | WO 98/56620 | 12/1998 | .......... B60R 21/20 |

Primary Examiner—Peter C. English
(74) Attorney, Agent, or Firm—Grossman, Tucker, Perreault & Pfleger, PLLC

(57) ABSTRACT

An apparatus for deploying an air bag through an automotive dash panel (12) includes an air bag door (16) integrally formed in the panel and defined by a door perimeter including a frangible edge (18) of reduced cross section. A dispenser (20) supports the air bag (24) behind the door. A metal reaction plate (28) is positioned between the air bag

(24) and the door (16). When the air bag inflates, it forces the reaction plate (28) to bend around a horizontal hinge line (36). As the reaction, plate pivots it concentrates inflation force along a lower portion of the frangible door edge. This helps to predictably separate the door from the dash panel by tearing along the lower door edge and allowing the tear to propagate up two side edges. In one embodiment, the tear also propagates across an upper edge to completely separate the door from the panel. At least one, and preferably two or three tethers (50) limit how far the door can travel during air bag inflation. A stop member may be included to limit reaction plate bending. After deployment, the reaction plate remains in a position that prevents the door from returning to its original position. A retaining structure may be included to preclude at least a portion of the air bag door from tearing free of the vehicle panel. A hinge (44) may be embedded in the panel in a position spanning a portion of the door perimeter. A hollow channel may be formed into the panel along the frangible marginal edge to create a substantial strength differential with the door perimeter to promote bending along the hinge and/or to help confine tearing to the frangible marginal edge during air bag deployment.

20 Claims, 22 Drawing Sheets

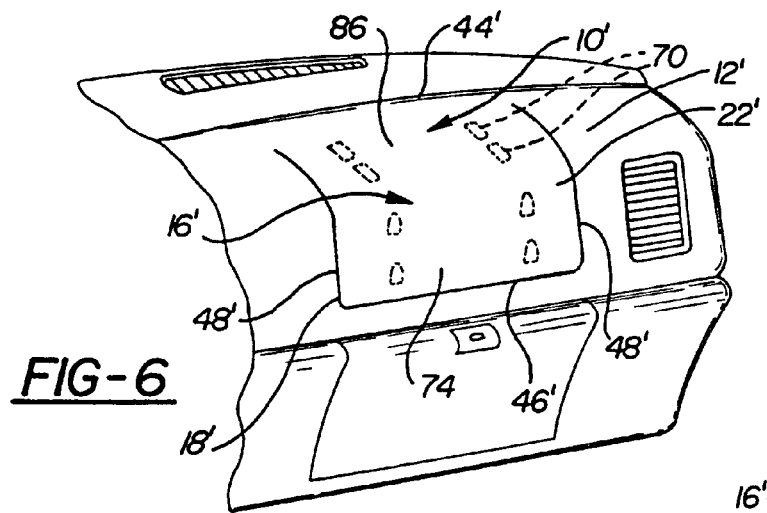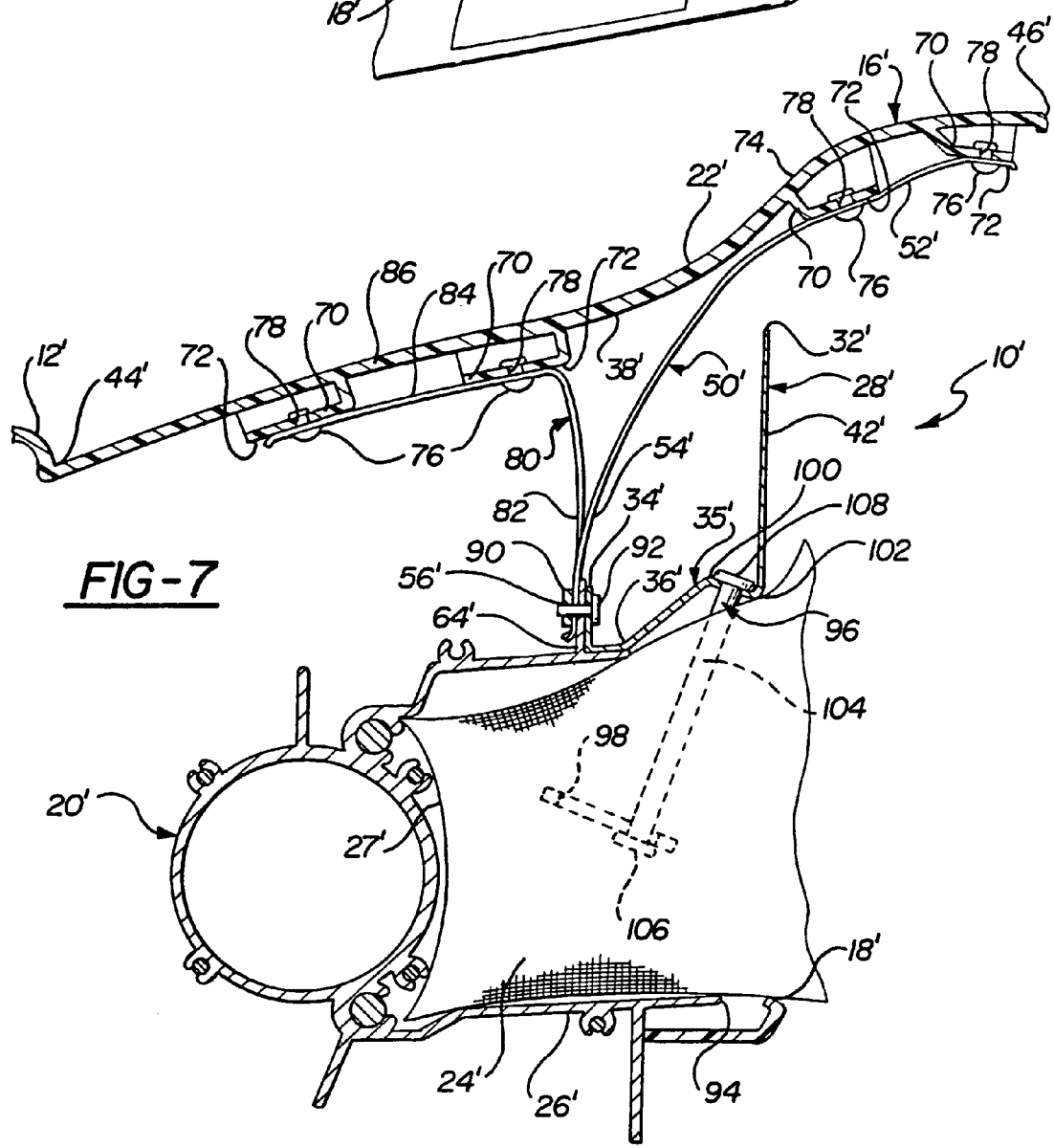

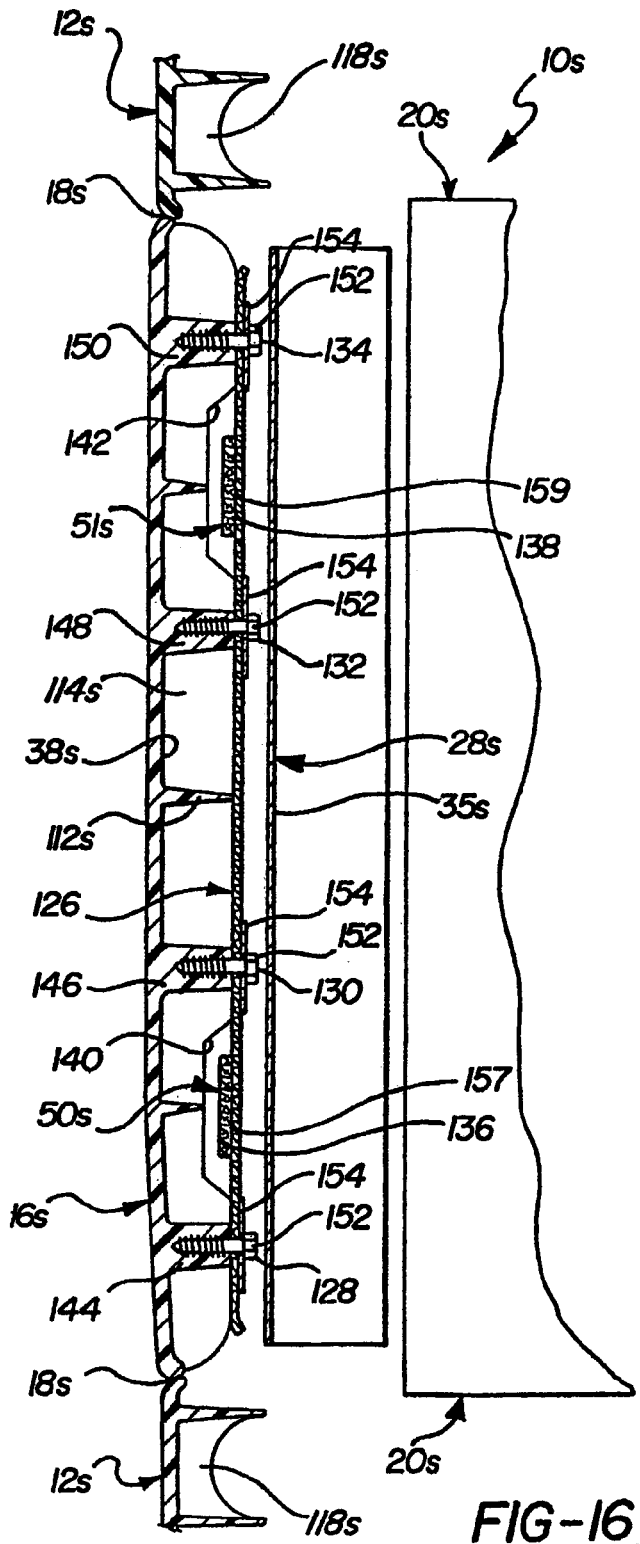
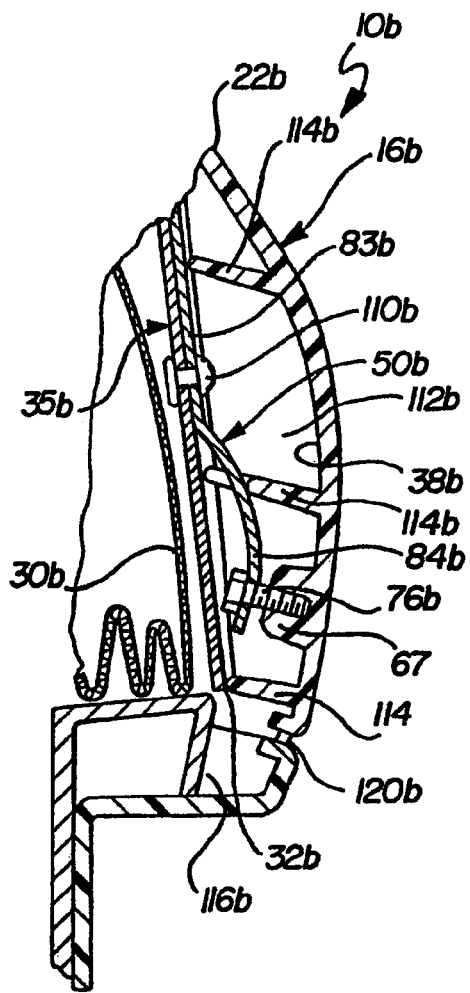
FIG-16
FIG-17

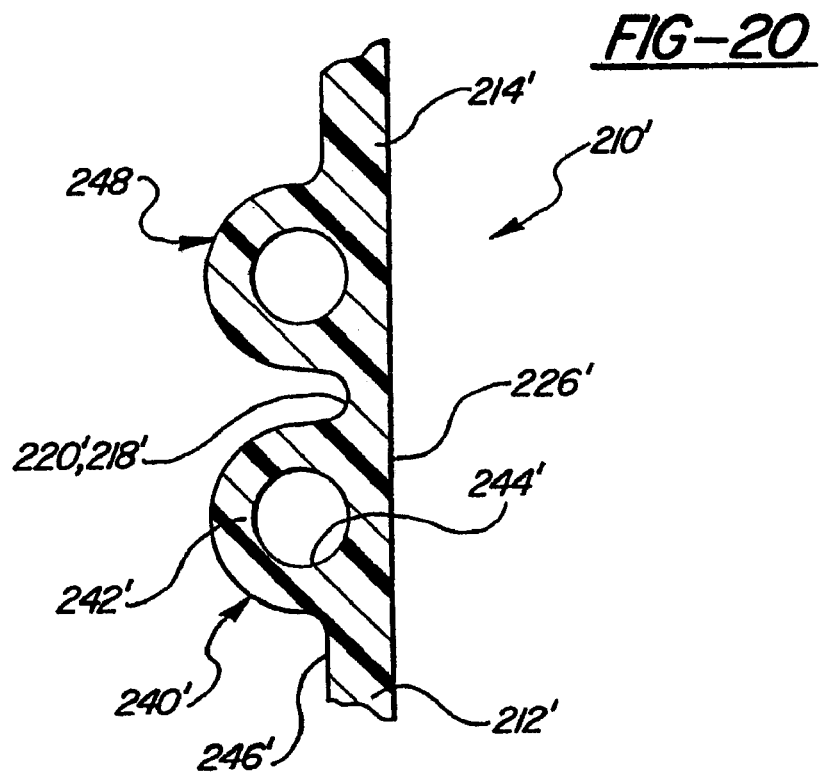
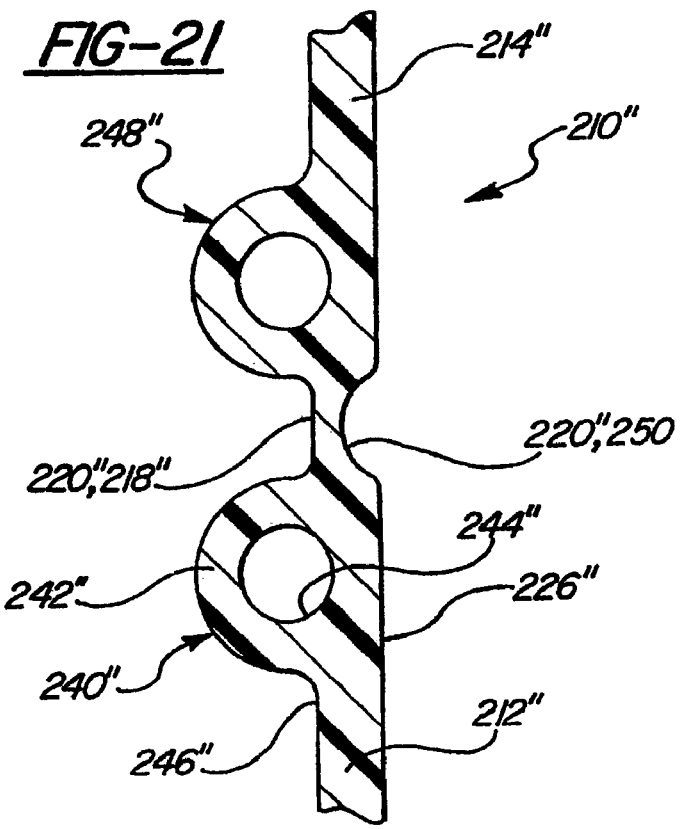

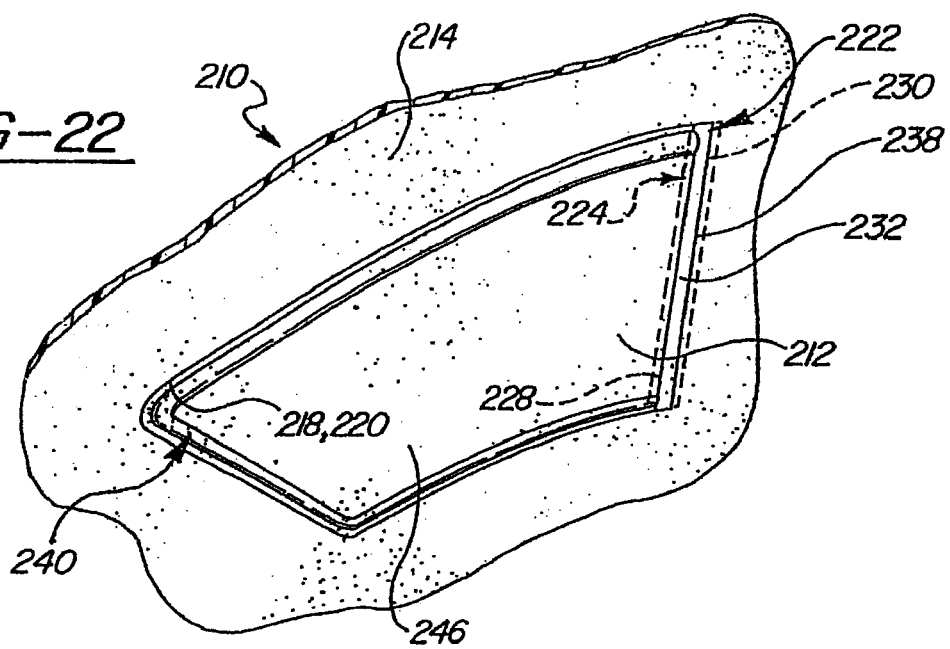
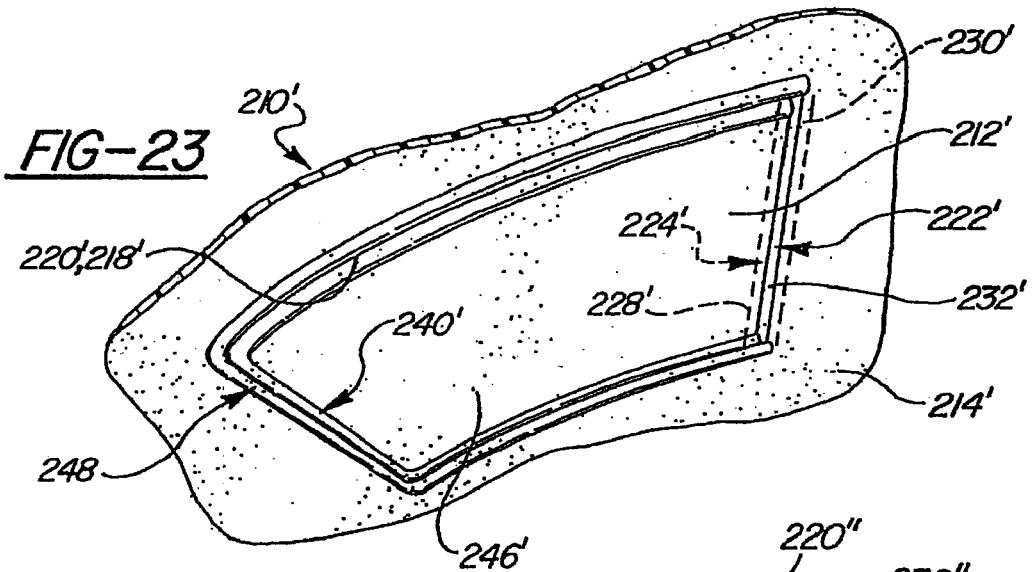
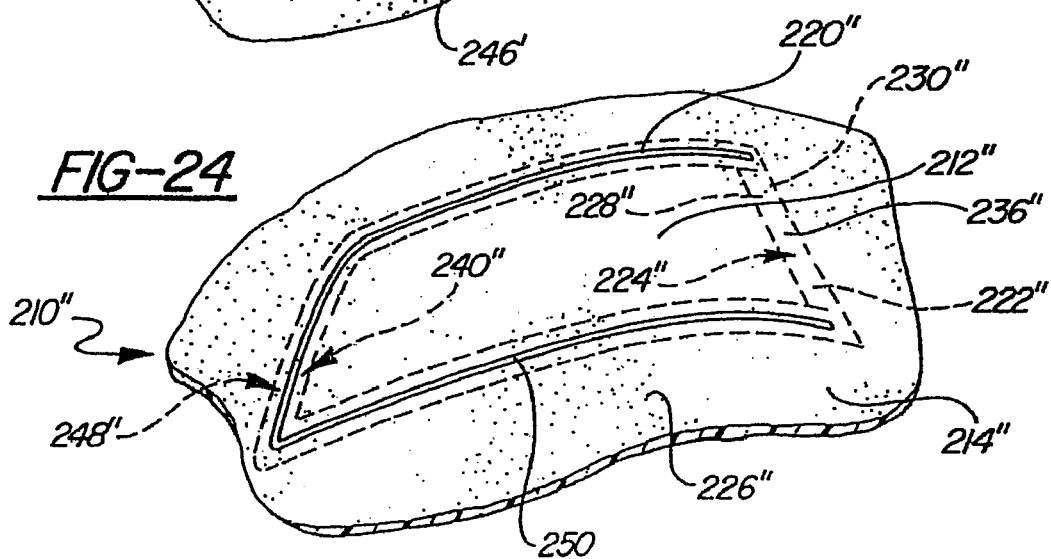

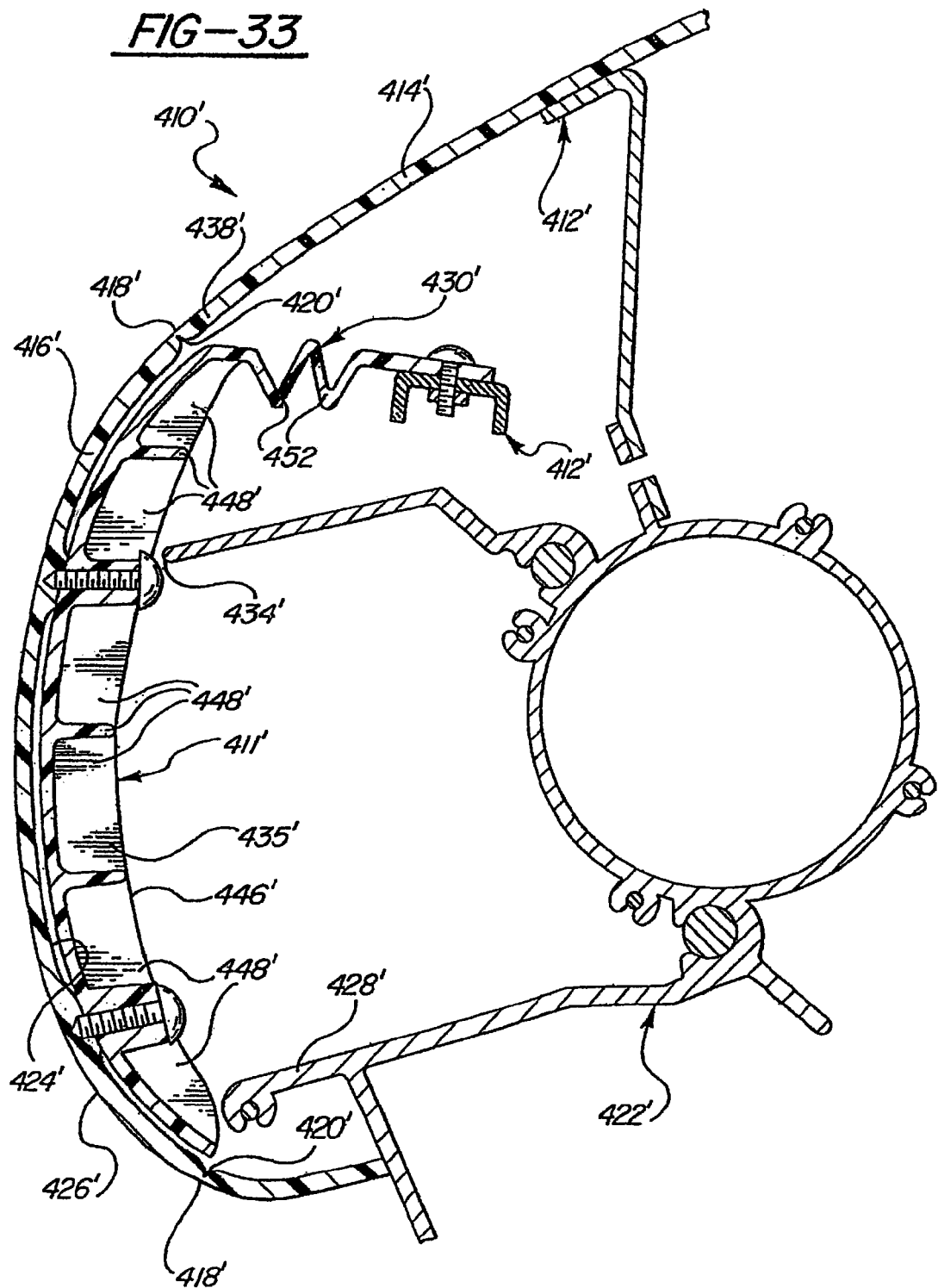

APPARATUS FOR DEPLOYING AN AIR BAG THROUGH A HARD PANEL

This application is the National Stage of International Application No. PCT/US99/13592, filed Jun. 16, 1999, which is a Continuation in Part of U.S. patent application Ser. No. 08/949,842, filed Oct. 14, 1997, U.S. Pat. No. 5,941,558, which is a Continuation in Part of U.S. patent application Ser. No. 08/871,243, filed Jun. 9, 1997, now abandoned. This application also claims priority of U.S. provisional application Ser. No. 60/089,836 filed Jun. 19, 1998 and Ser. No. 60/089,863 filed Jun. 19, 1998.

TECHNICAL FIELD

This invention relates generally to a passive supplemental inflatable restraint (PSIR) system having an air bag door that is integrally formed with an instrument panel and, more particularly, to such a system having an air bag door integrally formed with a hard first-surface instrument panel and configured to break and/or tear open in a predictable way.

BACKGROUND OF THE INVENTION

An inflatable restraint system having an air bag door that is integrally formed into an automotive vehicle instrument panel must include some provision for guiding or otherwise facilitating the opening and partial separation of that air bag door from the instrument panel that the door is integrally formed with. The air bag door in such a system opens to provide a path for an air bag to deploy through. It is desirable that whatever such provision is made includes some means for insuring that the air bag door breaks and/or tears open in a generally predictable way. This is true for driver-side inflatable restraint stems (DSIRs), passenger-side inflatable restraint systems (PSIRs) and inflatable restraint systems in vehicle door panels, quarter panels or other sidewall structures. It is also desirable for such systems to include means for insuring that portions of the door do not separate from the system when the air bag deploys and forces the door open.

The need to control breakage and/or tearing is particularly important with air bag doors that are integrally formed into hard first-surface instrument panels. The "first-surface" of a panel is the cosmetic exterior surface that would be visible to a vehicle occupant. Hard first-surface panels are typically formed by injection molding one or more plastic materials.

To close air bag deployment openings in hard first-surface instrument panels, many current PSIR systems use a separate "add-on" air bag door. One reason that current PSIR systems add on a separate air bag door in such applications is because it is difficult to cause a tear seam in an integrally formed door to break and/or tear in a predictable way under the sudden shock of a deploying air bag. Even when weakened, a tear seam that integrally joins an air bag door and a surrounding instrument panel can fracture in a ragged unpredictable manner that can affect air bag deployment.

One example of a hard first-surface system is disclosed in U.S. Pat. No. 5,472,228 assigned to Morton International and issued Dec. 5, 1995. This patent discloses a reinforced hard door with a reaction plate. When the air bag deploys, the reaction plate forces the door in a direction that will break weakened fasteners securing the door to an instrument panel.

Another of Morton's hard door concepts is shown in U.S. Pat. No. 5,533,746, issued Jul. 9, 1996. This system includes a reaction plate with reinforced lands. When the air bag deploys, it acts upon the reaction plate to cause hold down attachment rods to release from clips.

To control tearing and/or breaking, air bag doors that are integrally formed with automotive trim or instrument panels will sometimes include frangible marginal edges which are regions of weakened materials, reduced thickness or scoring and are commonly referred to as "tear seams." Tear seams are weak areas designed to tear and/or break when an air bag inflates and forces the door to open. Some of these systems also employ tethers and/or hinges that retain the air bag door to the instrument or trim panel after the door has torn and/or broken open. For example, U.S. Pat. No. 5,569,959, issued to Cooper et al., discloses an inflatable restraint assembly comprising an air bag door retainer portion integrally formed in an automotive instrument panel retainer and defined by a door perimeter. A frangible marginal edge or tear guide is included in a skin cover disposed over a foam layer that extends across the door opening. A metal hinge panel is embedded within the instrument panel retainer and spans a portion of the door perimeter. Cooper et al. also disclose a method for making such an inflatable restraint assembly. The method includes pre-molding the hinge panel into the hard instrument panel retainer portion such that the hinge panel spans the door perimeter.

With many current systems, the tear seams and/or hinges are formed in a hard instrument panel retainer portion rather than a skin cover. This can be done by a secondary operation such as casting weakened material, or cutting, grinding or laser scoring performed after a manufacturing step of integrally molding the instrument panel and door. Current systems also include tear seams formed in back surfaces opposite the outer class-A surfaces of integral instrument panel/air bag door structures to improve the aesthetic appearance of the instrument panel by concealing the presence of the door.

At least one automotive instrument panel, as shown and described in U.S. Pat. No. 5,162,092, issued to Klobucar et al., discloses an instrument panel having a tubular channel and a method for forming the channel in the panel. The tubular channel is integrally formed in the panel by injecting gas into molten panel material in a mold. The tubular channel in the Klobucar et al. instrument panel adds structural rigidity. However, Klobucar et al. does not disclose an air bag door or any other supplemental inflatable restraint component.

What is needed is an apparatus that, in response to air bag deployment, more cleanly and predictably separates and opens an air bag door that is integrally formed into an instrument panel. What is also needed is such an apparatus that helps separate and open an air bag door that is integrally formed into a hard first-surface instrument panel.

SUMMARY OF THE INVENTION

According to the invention, an inflatable restraint assembly for an automotive vehicle is provided that comprises a reaction plate that includes an integral tether. The tether is connected to a support structure and is integrally connected to a pivotable panel portion of the reaction plate. The support structure comprises an interior vehicle panel. An air bag deployment door is integrally formed in the vehicle panel. At least a portion of a perimeter of the door is defined by a frangible marginal edge. An air bag dispenser is supported adjacent a door inner surface. An air bag is supported in an air bag receptacle of the air bag dispenser. The air bag has an inner end operatively connected to the air bag dispenser and an outer end disposed adjacent the air bag deployment door. The air bag dispenser is configured to direct air bag deployment through an air bag receptacle opening and along a deployment path through the vehicle panel. The reaction plate is disposed between the air bag and the air bag deployment door and is configured to receive the force of air bag deployment from the dispenser and to direct and distribute that force against the door inner surface to separate the door from the vehicle panel along the frangible marginal edge of the door. The pivotable panel portion of the reaction plate is configured to pivot outward under the force of air bag inflation while being securely retained by the integral tether. The reaction plate and integral tether cooperate to provide an opening motion that cleanly separates the air bag door along the frangible marginal edge.

According to another aspect of the invention, the reaction plate comprises a plastics material such as thermoplastic urethane.

According to another aspect of the invention, a plurality of integral ribs extend integrally inward from an inner surface of the pivotable panel portion of the reaction plate to provide additional structural stiffness to that portion of the plastic reaction plate.

According to another aspect of the invention, the integral tether is connected to the support structure by a sliding hinge. The sliding hinge allows the reaction plate to slide outwardly when the air bag deploys and forces the reaction plate to pivot outward. This outward motion prevents the pivotable panel portion of the reaction plate from binding against an upper edge of the opening left by the opening of the air bag deployment door during air bag deployment.

According to another aspect of the invention, the integral tether is connected to the support structure by a fastener and the sliding hinge includes a slotted fastener hole in the integral tether configured to slidably receive a shaft portion of the fastener to allow the integral tether to slide outwardly.

According to another aspect of the invention, the integral tether includes fanfolds configured to allow the tether to elongate when a deploying air bag forces the reaction plate outward. As with the sliding hinge, the fanfolds provide outward motion that prevents the pivotable panel portion from binding against the upper edge of the air bag deployment door opening during air bag deployment.

According to another aspect of the invention, a tubular channel is disposed along at least a portion of the air bag door perimeter. The tubular channel is disposed opposite an outer surface of the air bag door and vehicle panel. A second structural channel may be disposed adjacent and parallel to the first tubular channel with the perimeter disposed between the first and second tubular channels. One of the tubular channels is integrally formed with the door and the other tubular channel is integrally formed with the vehicle panel. The tubular channels confine tearing to the perimeter without adding a significant amount of material that can cause sinks in the outer surface.

According to another aspect of the invention, a screw boss integrally extends inward from one of the tubular channels and is configured to receive a fastener connecting the reaction plate tether portion to the screw boss. The tubular channel reduces the chance that sinks might develop in the outer surface of the panel beneath the screw boss. A tubular channel may also extend integrally inward from the inner surface of the door with a screw boss integrally extending inward from that tubular channel. In this case, the screw boss is configured to receive a fastener connecting the reaction plate to the screw boss.

According to another aspect of the invention, the air bag deployment door includes a marginal edge that forms a hinge between the vehicle panel and the door. The hinge includes a hinge panel comprising a second material embedded at least partially within the first material and spanning the door perimeter. The second material includes any one or more materials from a group of materials including thermoplastic rubber, glass matte, fabric and metal.

According to another aspect of the invention, the perimeter of the air bag door is generally shaped to approximate the shape of the air bag canister opening.

According to another aspect of the invention, a method for making an inflatable restraint assembly is provided. The method includes providing a mold configured to form the shape of the integral air bag door and trim panel and the tubular channel. Material is then provided in the mold and gas is injected into a portion of the material disposed in a portion of the mold configured to form the tubular channel. The material is then allowed to solidify within the mold and the solidified material is removed from the mold.

BRIEF DESCRIPTION OF THE DRAWINGS

To better understand and appreciate the invention, refer to the following detailed description in connection with the accompanying drawings:

FIG. 6 is a fragmentary perspective view of the air bag door of FIG. 5 installed in a vehicle dash panel;

FIG. 7 is a cross-sectional end view of the passive restraint system of FIG. 4 during air bag inflation;

FIG. 8 is a cross sectional view of a heat-stake pin of the passive restraint system of FIGS. 1 and 2;

FIG. 16 is a cross-sectional view of the passive restraint system of FIG. 12 taken along line 16—16 of FIG. 14;

FIG. 17 is a partial cross-sectional view of the passive restraint system of FIGS. 9–11 including an alternative tether attachment construction;

FIG. 20 is a cross-sectional view of a break-away/tear seam of a second embodiment of an integral air bag door and instrument panel constructed according to the invention;

FIG. 21 is a cross-sectional view of a break-away/tear seam of a third embodiment of an integral air bag door and instrument panel constructed according to the invention;

FIG. 22 is a partial perspective bottom view of the integral air bag door and instrument panel of FIG. 19;

FIG. 23 is a partial perspective bottom view of the integral air bag door and instrument panel of FIG. 20; and FIG. 24 is a partial perspective top view of the integral air bag door and instrument panel of FIG. 21;

FIG. 33 is a side cross-sectional view of an air bag canister assembly having a plastic reaction plate constructed according to the invention and supported by an integral fanfold tether strap;

DETAILED DESCRIPTION OF THE PREFERRED EMBODIMENT

Figure 1:
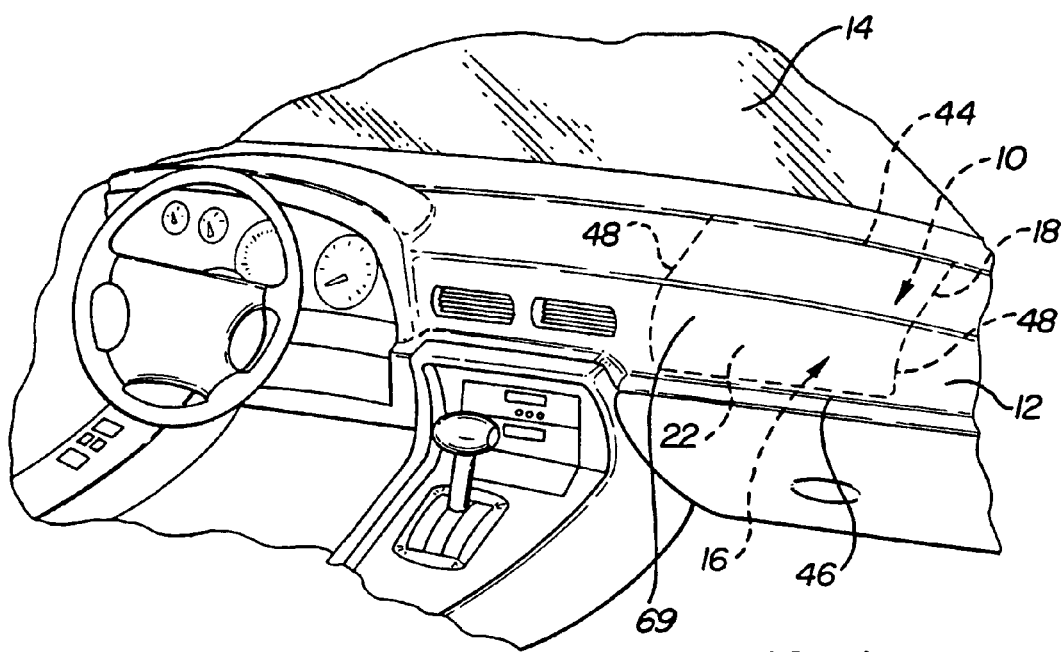
FIG. 1 is a perspective view of a first passive restraint system constructed according to the present invention and installed in a vehicle dash panel.
Figure 2:
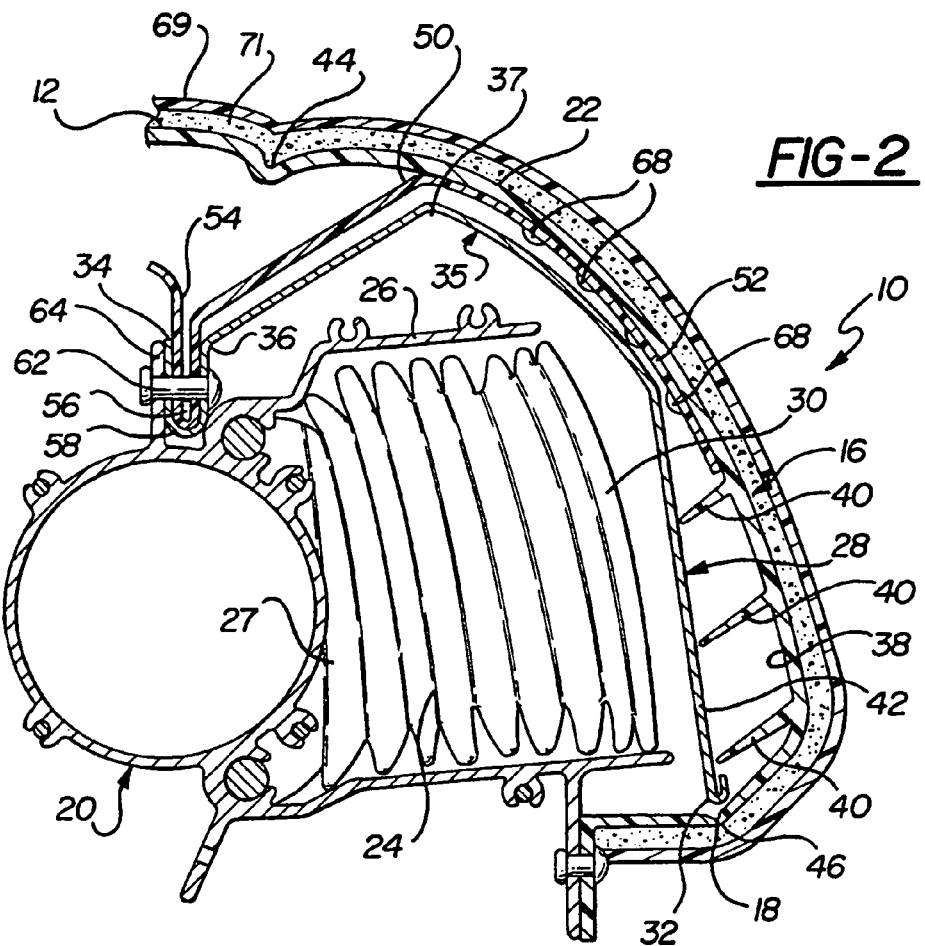
FIG. 2 is a cross-sectional end view of the passive restraint system of FIG. 1.
Figure 3:
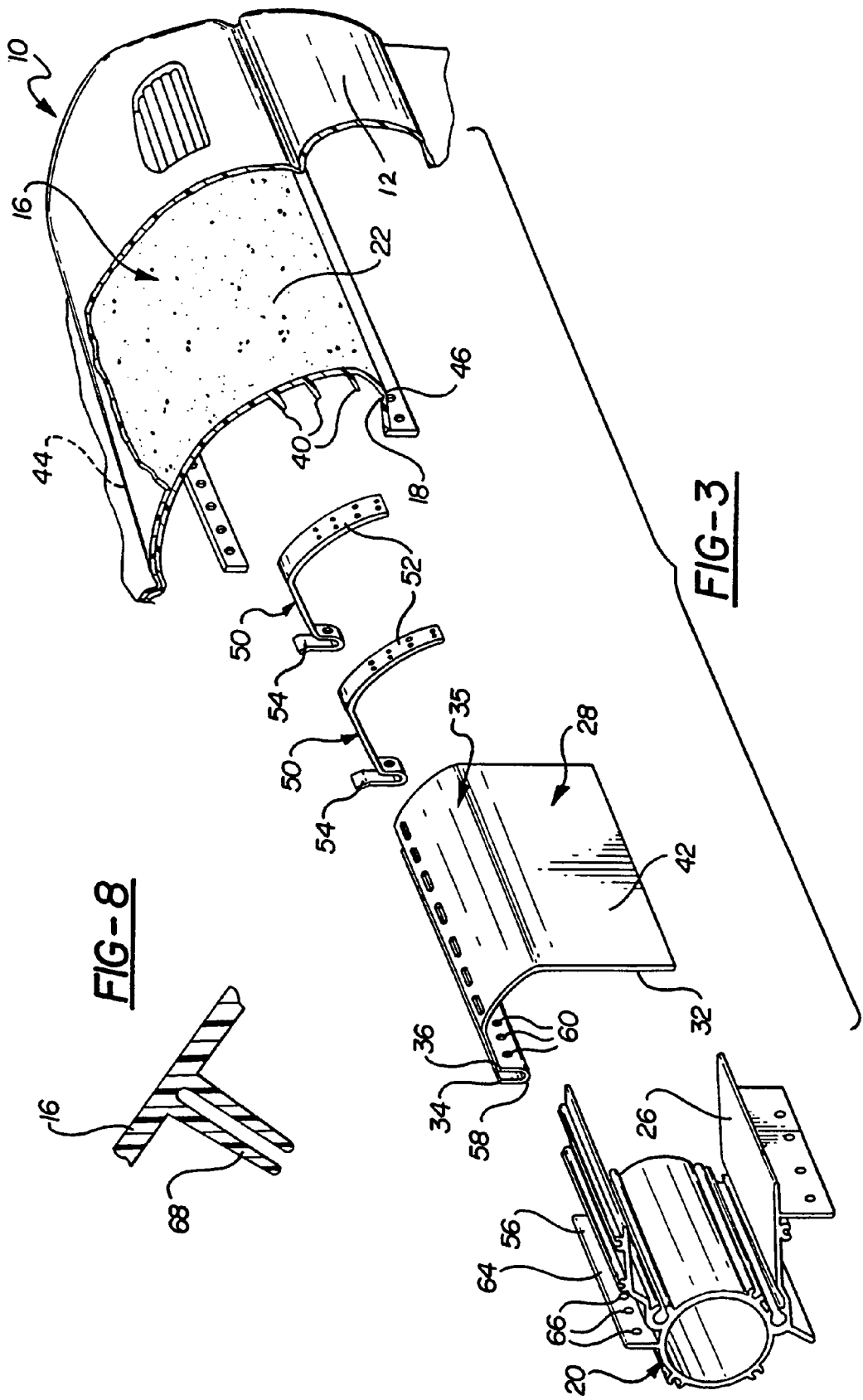
FIG. 3 is an exploded view of the passive restraint system of FIG. 1.

A first embodiment of an inflatable restraint assembly for an automotive vehicle is generally indicated at 10 in FIGS. 1–3. A second embodiment is generally indicated at 10' in FIGS. 4–7. A third embodiment is generally indicated at 10" in FIGS. 9–11. Reference numerals with the designation prime (') in FIGS. 4–7 and double prime (") in FIGS. 9–11 indicate alternative configurations of elements that also appear in the first embodiment. Where a portion of the following description uses a reference numeral to refer to the figures, we intend that portion of the description to apply equally to elements designated by primed numerals in FIGS. 4–7 and double-primed numerals in FIGS. 9–11.

An alternative construction of the third embodiment is generally indicated at 10b in FIG. 17. Reference numerals with the suffix "b" in FIG. 17 indicate elements of FIG. 17 that correspond to similar or identical elements shown in FIGS. 9–11. Where a portion of the description of the third embodiment uses a reference numeral to refer to the figures, we intend that portion of the description to apply equally to elements designated by the suffix "b" in FIG. 17.

In FIG. 1, the inflatable restraint assembly is shown hidden behind an automotive vehicle passenger-side dash panel 12 below a windshield 14 of the vehicle. As shown in FIG. 2, the apparatus includes the panel 12, and an air bag deployment door 16 integrally formed in the panel 12 and having a perimeter defined, in part, by a hidden marginal edge 18. The perimeter may, also be defined as the lateral boundary of the door 16—the door 16 being defined as that portion of the integrally formed panel 12 and 5 door 16 that is separable or bendable from the panel 12 under the force of air bag inflation. The door 16 and the vehicle dash panel 12 are integrally formed as a single unitary piece.

As shown in FIGS. 2 and 3, an air bag dispenser assembly 20 is supported behind the door 16, i.e., on a side of the door 16 opposite a door outer surface 22. The dispenser 20 is also disposed adjacent and aligned with the air bag deployment door 16. As is best shown in FIG. 2, the air bag dispenser 20 is configured to direct air bag deployment along a deployment path through the door 16 of the vehicle panel 12, the air bag deployment path being the path that the air bag will travel along as it inflates during deployment. The air bag deployment path is best exemplified by the respective areas occupied by the inflated air bags shown at 24' in FIG. 7, 24" in FIG. 11, and at 24s in FIGS. 13 and 15. The dispenser 20 may be any suitable type of air bag dispenser to include, for example, the dispenser described in U.S. Pat. No. 5,564,731 and incorporated herein by reference.

An air bag 24 is supported in an air bag receptacle 26 of the air bag dispenser 20 and is operatively connected to the air bag dispenser 20 at an open end 27 of the air bag 24. A closed outer end 30 of the air bag 24 is disposed adjacent the air bag 24 deployment door 16.

As is best shown in FIG. 2, a rigid metal reaction plate 28 is disposed between the air bag 24 and the air bag deployment door 16. The reaction plate 28 receives the force of air bag deployment when the air bag 24 inflates and expands out of the dispenser 20. The reaction plate 28 directs and distributes that force across the door 16 to predictably separate the door 16 from the panel 12 along the hidden margin edge 18 of the door 16. By distributing the air bag 24 opening force across the door 16 the reaction plate 28 also serves to prevent air bag 24 opening forces from concentrating in other locations on the door 16 that might result in door 16 or panel 12 fractures and/or fragmentation. In the present embodiment, the reaction plate 28 is positioned to concentrate air bag opening forces along a portion of the hidden marginal edge 18 that extends along the forward marginal edge 46 of the door 16. The reaction plate 28 is positioned in this way to initiate marginal edge tearing at the forward marginal edge 46 and then allow the tearing to propagate upward along the two side edges of the door 16. Alternatively, marginal edge tearing may be initiated at the forward marginal edge 46 and along the two side edges virtually simultaneously. The reaction plate 18 is preferably made of cold rolled steel but may be made from any other material having suitable bending and force-distributing characteristics.

As is best shown in FIG. 3, the reaction plate 28 includes a reaction plate outer marginal edge 32 having a shape generally identical to that of the hidden marginal edge 18 of the air bag deployment door 16. The reaction plate marginal edge 32 is aligned with the hidden marginal edge 18 of the air bag deployment door 16 to concentrate air bag 24 inflation stress along the hidden marginal edge 18 of the air bag deployment door 16.

As shown in FIG. 2, the reaction plate 28 is pivotally attached along a reaction plate inner edge 34 to the air bag dispenser apparatus 20. However, in other embodiments, the reaction plate 28 may be pivotally attached to a portion of the panel 12 or other surrounding support structures. An outer pivotable portion of the reaction plate 28, generally indicated at 35 in FIGS. 2 and 3, is outwardly and upwardly pivotable away from the air bag dispenser 20. The outer reaction plate portion 35 pivots by bending along a first horizontal hinge line 36 of the reaction plate 28 that extends parallel to and adjacent the rigidly attached inner plate edge 34. The hinge line 36 defines a marginal inner edge of the outer portion 35 of the reaction plate. A pivotable lower panel portion 42 of the reaction plate also pivots by bending along a second horizontal hinge line 37 of the reaction plate 28 that extends parallel to the first hinge line 36. The force of an inflating air bag causes the outer portion 35 of the reaction plate 28, which includes the pivotable lower panel portion 42 of the reaction plate 28, to pivot outward. The pivotable lower panel portion 42 of the reaction plate 28 then continues pivoting, due to angular momentum acquired from air bag deployment, into a position angularly spaced from the air bag deployment path and more than 45 degrees from its position before air bag deployment. Examples of such an angularly spaced position of the lower panel portions of reaction plates are shown by reference to lower panel portions 42' and 42" in FIGS. 7 and 11, respectively.

As shown in FIG. 2, the outer portion 35 of the reaction plate 28 is disposed adjacent a door inner surface 38 and opposite the outer door surface 22. As is best shown in FIG. 2, the outer portion 35 and, therefore, the pivotable lower panel portion 42 of the reaction plate 28 are separate from the door 16. This allows the outer portion 35 and pivotable lower panel portion 42 of the reaction plate 28 to move independently of the door 16 following door separation. This prevents the outer portion 35 of the reaction plate 28 from arresting or restricting the opening motion of the door 16.

Three horizontal ribs, shown at 40 in FIGS. 2 and 3, extend integrally inward from the door inner surface 38 to a point adjacent the pivotable lower panel portion 42 of the outer portion 35 of the reaction plate as shown in FIGS. 2 and 3. The ribs 40 space the reaction plate lower panel 42 from the door inner surface 38. The ribs 40 allow the reaction plate 28 to be positioned in a plane that is generally perpendicular to the direction of air bag 24 deployment while remaining in close proximity to the door 16. The ribs 40 also allow the door 16 to be designed with outer contours that do not necessarily correspond to the reaction plate 28 configuration. In other embodiments, the ribs 40 may be of any suitable configuration and orientation known in the art.

As shown in FIGS. 1–3, the air bag deployment door 16 has a curved rectangular shape defined by relatively straight aft 44 and forward 46 marginal edges and a pair of arcade side marginal edges 48. The forward 46 and side 48 edges comprise a frangible region of reduced cross section. The rear edge 44 may comprise a sling seam or groove intended to define the rear edge 44 of the door 16. In other embodiments, the rear edge 44 may be hidden or there may be no "rear edge". In other words, the transition from the door to the panel 12 may be uninterrupted.

Where a styling seam is used, it may be functional or merely aesthetic. Where the styling seam is functional, it may be adapted to act as a bending hinge 44 when the door 16 is forced open and separated from the surrounding vehicle panel 12 along the frangible forward 46 and side 48 marginal edges. The bending hinge 44 allows the door 16 to swing outward and upward from the panel 12 during air bag 24 deployment while retaining the door 16 to the panel 12. Alternatively, the styling seam may also be designed as a frangible region of reduced cross section in similar fashion to the forward 46 and side 48 edges.

A first pair of flexible tethers is generally indicated at 50 in FIGS. 2 and 3. Each tether comprises PVC-coated nylon, has an outer end portion 52 fastened to the door inner surface 38, and an inner end portion 54 fastened to the air bag dispenser assembly 20. In other embodiments, the first pair of flexible tethers 50 may be fastened to the panel 12 or other adjacent support structures instead of the dispenser 20. The tethers 50 may incorporate any one or more of a number of different tether constructions known in the art. One example of an acceptable tether construction is disclosed in U.S. Pat. No. 5,564,731, is assigned to the assignee of the present invention and is incorporated herein by reference.

The inner end portion 54 of each tether 50 of the first pair of tethers is fastened to the air bag dispenser assembly 20 at a tether control point shown at 56 in FIG. 2 adjacent the reaction plate inner edge 34. The tether inner end portions 54 are fastened by folding them within a U-shaped channel 58 formed along the reaction plate inner edge 34. As shown in FIG. 3, a row of holes 60 is formed along each side of the U-shaped reaction plate channel 58 to receive fasteners 62 that attach the reaction plate 28 to an elongated rectangular air bag dispenser flange 64. The dispenser flange 64 is horizontally disposed and extends integrally upward from the air bag dispenser apparatus 20. The flange 64 includes a row of flange holes 66 corresponding to the holes in the U-shaped reaction plate channel 58. One or more of the fasteners that connect the reaction plate 28 to the dispenser assembly 20 also pass through the portion of each tether inner end 54 that is folded within the U-shaped channel 58.

As is best shown in FIG. 2, the outer end portion 52 of each tether 50 of the first pair of tethers is fastened to the door 16 by eight heat-staked pins 68. The pins 68 extend integrally inward from the air bag 24 deployment door 16 as shown in FIG. 8. The pins 68 are preferably formed with the door 16 and the vehicle panel 12 as a single unitary piece. Other embodiments may use hot staked bosses as disclosed in U.S. Pat. No. 5,564,731, assigned to the assignee of the present invention and incorporated herein by reference. Still other embodiments may use screws 76*b* engaged with screw bosses as is representatively shown at 67 in FIG. 17. The screw bosses 67 may be integrally formed to extend inward from the door 16. The bosses 67 may be threaded or unthreaded for use with self-tapping screws. Other embodiments may use any number of suitable fastening means known in the art.

The bag inflatable restraint assembly 10 described above is optimized to open integral doors in vehicle trim panels, comprising hard outer or "first" surfaces, e.g., injection-molded panels. However, the invention may also be used where, as shown in FIG. 2, the hard outer surface is covered with a flexible skin 69 or skin 69 and foam 71 layers. In other words, a flexible skin 69 may be applied to cover at least a portion of the vehicle dash panel 12 and/or air bag deployment door 16 in a layered disposition. A foam layer 71 may also be included between the skin 69 and a portion of the panel 12 and/or the door 16.

The door 16 and panel 12 preferably comprise an injection molded polycarbonate/acrylonitrile butadiene styrene blend (PC/ABS) or polypropylene. Examples of acceptable PC ABS formulations include GE MC 8002 and Dow Pulse

830. An example of an acceptable polypropylene is Montell #BR33GC. Other suitable materials may include polyesters, polyurethanes, polyphenylene oxide, polystyrenes, polyolefins, or polyolefin elastomers.

According to the second embodiment of the invention shown in FIGS. 4–7, the air bag deployment door 16' is defined by a visible marginal edge 18' and includes eight doghouse-shaped fastener brackets 70. Each fastener bracket 70 extends integrally inward toward the air bag dispenser assembly 20' from the door inner surface 38' in place of the ribs 40 of the first embodiment. Each fastener bracket 70 includes an attachment surface 72 spaced inwardly from and supported generally parallel to the door inner surface 38'. The fastener brackets 70 are preferably integrally formed with the door 16' and the vehicle dash panel 12' as a single unitary piece.

The first tether 50' of the second embodiment makes up a portion of a single continuous tether sheet rather than comprising two separate tethers as in the first embodiment. As shown in FIGS. 4–7, an outer end 52' of the first tether 50' is attached to a forward portion 74 of the door 16' adjacent a forward marginal edge 46' of the door 16' disposed opposite the hinge 44'. More specifically, four rivets 76 attach the outer end 52' of the first tether 50' to the attachment surfaces 72 of four fastener brackets 70 formed on the forward portion 74 of the door 16. The fastener brackets 70 support the rivets 76 without affecting the aesthetic continuity of the outer door surface 22'. In other embodiments, other fastener bracket configurations including heat staking pins and screw bosses and other suitable types of fasteners and fastening methods may be used as is known in the art.

Figure 4:
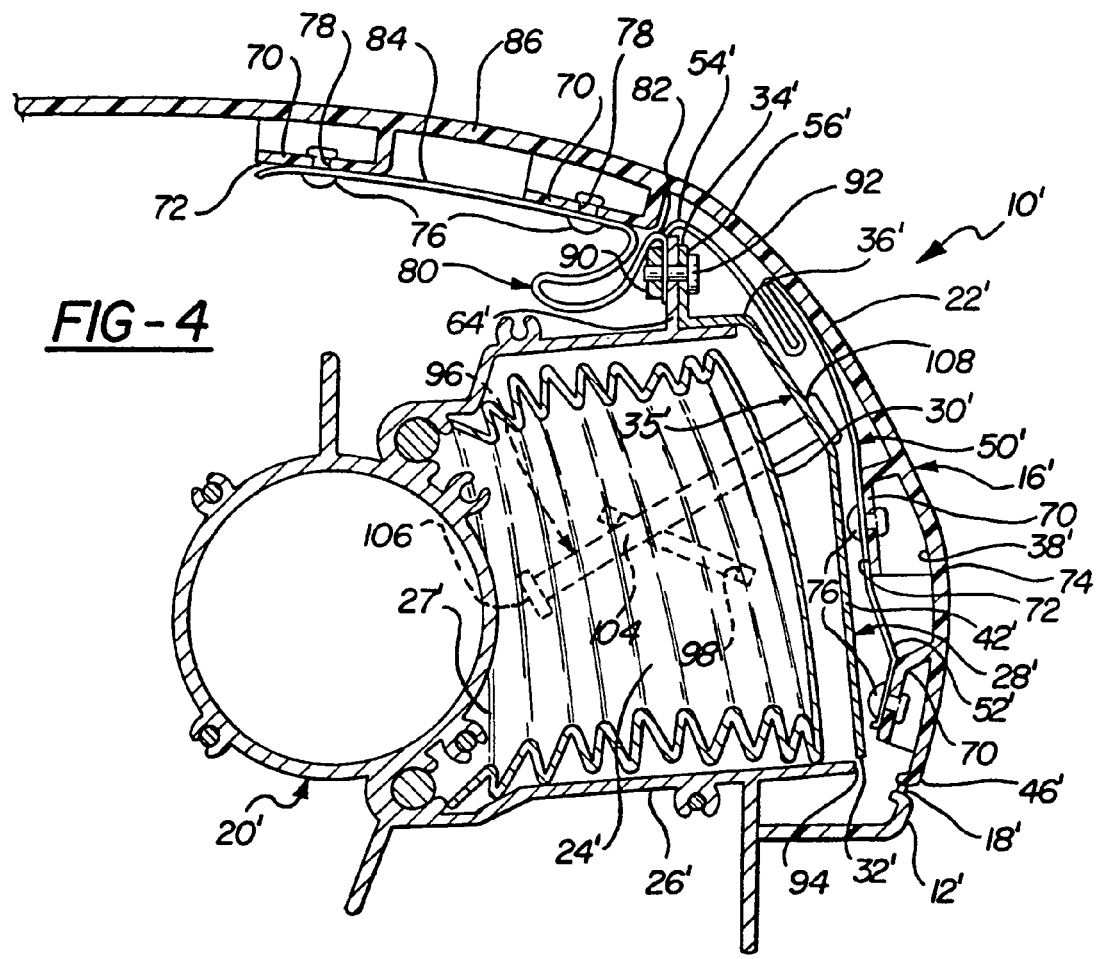
FIG. 4 is a cross-sectional end view of a second passive restraint system constructed according to the present invention.
Figure 5:
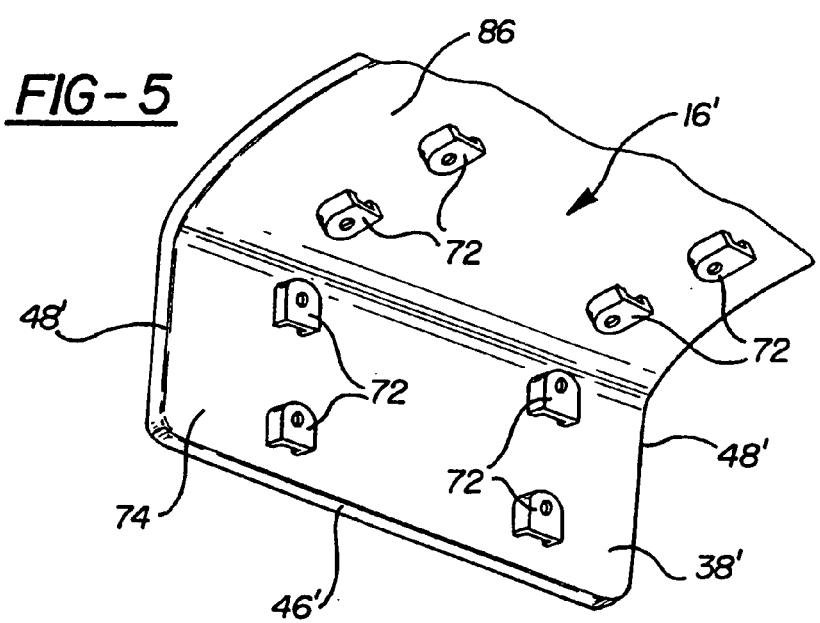
FIG. 5 is a fragmentary perspective view of an air bag door of the passive restraint system of FIG. 4.

As shown in FIGS. 4 and 7, each fastener bracket 70 includes a fastener aperture 78 disposed through the attachment surface 72 of the bracket 70 to receive one of the rivets 76. Each rivet 76 comprises a shaft portion that extends through the aperture 78 and through a hole formed in the first tether 50' to hold the first tether 50' to the fastener bracket 70 in conventional fashion.

The four fastener brackets 70 that attach the first tether 50' to the door 16' extend integrally inward from the door inner surface 38' adjacent a lower marginal region of the door 16' to a point adjacent the reaction plate 28'. Similar to the ribs 40 of the first embodiment, the fastener brackets 70 present the reaction plate lower panel 42' in a plane more perpendicular to the direction of air bag 24' deployment from the dispenser 20'. In other words, the fastener brackets 70 span the space between the outwardly curved lower marginal door region and the generally vertical reaction plate lower panel 42'.

The single continuous tether sheet that includes the first flexible tether 50' also includes a second flexible tether, generally indicated at 80 in FIGS. 4 and 7. The second tether 80 has an inner end portion 82 fastened to the air bag dispenser assembly 20' at the tether control point 56'. In other embodiments, the second tether 80 may be secured either to the panel 12' or to another adjacent structure. The second flexible tether 80 has an outer end portion, shown at 84 in FIGS. 4 and 7, that is fastened to an aft portion 86 of the door 16' disposed between the forward door portion 74 and the hinge 44'. The second tether 80 ties the aft door portion 86 to the control point 56' to prevent any portion of the door from over-pivoting towards the windshield 14 and breaking off at one of several potential bending points including the hinge 44'.

As shown in FIGS. 4 and 7, the respective inner ends 54', 82 of the first 50' and second 80 tethers are riveted to an elongated rectangular flange 64' 5 at the tether control point 56'. The flange 64' extends integrally upward from the air bag receptacle portion 26' of the air bag dispenser assembly 20'. The tether inner ends 54', 82 are sandwiched between the flange 64' and an elongated metal bar 90. Rivets 92 pass through the flange 64', the tethers 50', 80 and the bar 90.

The air bag receptacle 26' includes a mouth 94 disposed adjacent the air bag deployment door 16'. The mouth 94 has a width measured across the mouth in a direction perpendicular to the hinge 44', i.e., in a generally vertical direction. The hinge 44' is spaced from the mouth 94 a distance equal to at least half of the mouth width. The hinge 44' is displaced in this manner to reduce the maximum opening angle at the hinge 44' to reduce material deformation and stress in the hinge during air bag 24 deployment.

A pair of rigid stop members, representatively indicated at 96 in FIG. 7, are operatively connected to the reaction plate 28' and the air bag dispenser 20'. The stop members 96 limit reaction plate 28' opening travel. The stop members 96 may arrest the reaction plate 28' in a position that will prevent the door 16' from returning to its original position after air bag 24' deployment. Each stop member is preferably fabricated from steel but may be made of other suitably rigid materials.

The stop members 96 are slidably supported in slots representatively shown at 98 in FIG. 7 and disposed at opposite lateral sides of the receptacle portion 26' of the air bag dispenser apparatus 20'. Each stop member 96 is fixed to the reaction plate 28' at a stop point representatively shown at 100 in FIG. 7. The stop point 100 is disposed between the first hinge line 36' and a reaction plate outer marginal edge 32' disposed opposite the reaction plate inner edge 34'.

The outer panel portion 42' of the reaction plate 28' is outwardly and upwardly pivotable away from the air bag dispenser 20' by bending the reaction plate 28' along a second horizontal hinge line shown at 102 in FIG. 7. The second hinge line 102 is disposed horizontally across the reaction plate 28' adjacent the stop point 100 and extends generally parallel to the first hinge line 36'. The second hinge line 102 is spaced approximately one-third the distance between the first hinge line 36' and the reaction plate outer marginal edge 32'. This double hinge arrangement allows the reaction plate 28' to bend into an outwardly pivoted and upwardly extended position. In this position the plate 28' prevents the air bag deployment door 16' from rebounding off the tethers 50', 80 and returning to its original position immediately after a deploying air bag 24' has forced the door 16' open.

Each stop member 96 is an elongated steel pin having a cylindrical shaft portion 104 as is representatively shown in FIG. 7. Inner 106 and outer 108 circular disk-shaped stop flanges are disposed at respective inner and outer distal ends of the shaft portion 104 of each stop member 96. The inner stop flange 106 of each stop member 96 extends radially and integrally outward from the shaft portion 104. The outer stop flange 108 of each stop member 96 is preferably fixed to the reaction plate 28' by spot welding or arc welding.

The elongated slots 98 on either side of the air bag receptacle 26' each have a width slightly greater than that of the shaft portion 104 of each stop member 96. The shaft portion 104 of each stop member 96 is slidably disposed within one of the slots 98 to allow the stop members 96 to move between pre-inflation stowed positions, representatively shown in FIG. 4, and post-inflation deployed positions, representatively shown in FIG. 7. The reaction plate 28' pulls the stop members 96 from the stowed position to the deployed position when the reaction plate 28' opens under the force of an inflating air bag 24'. When the stop members 96 reach their deployed positions the inner stop flanges 106 engage the slot 98 and arrest reaction plate 28' movement. The stop members 96 arrest the reaction plate 28' in a position to prevent the door 16' from returning to its original position following air bag deployment.

Figure 9:
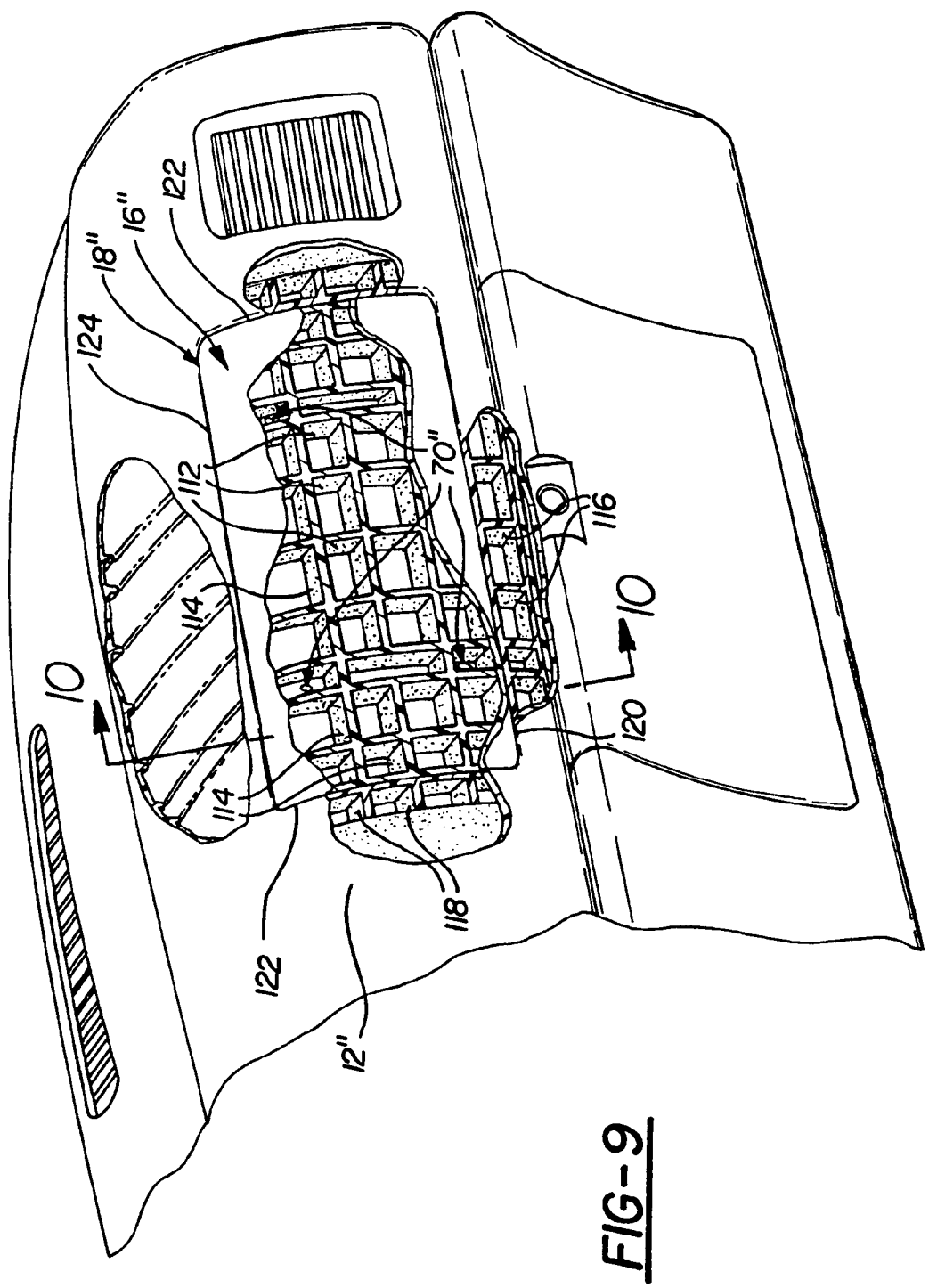
FIG. 9 is a perspective view of a third passive restraint system constructed according to the present invention and installed in a vehicle dash panel.
Figure 10:
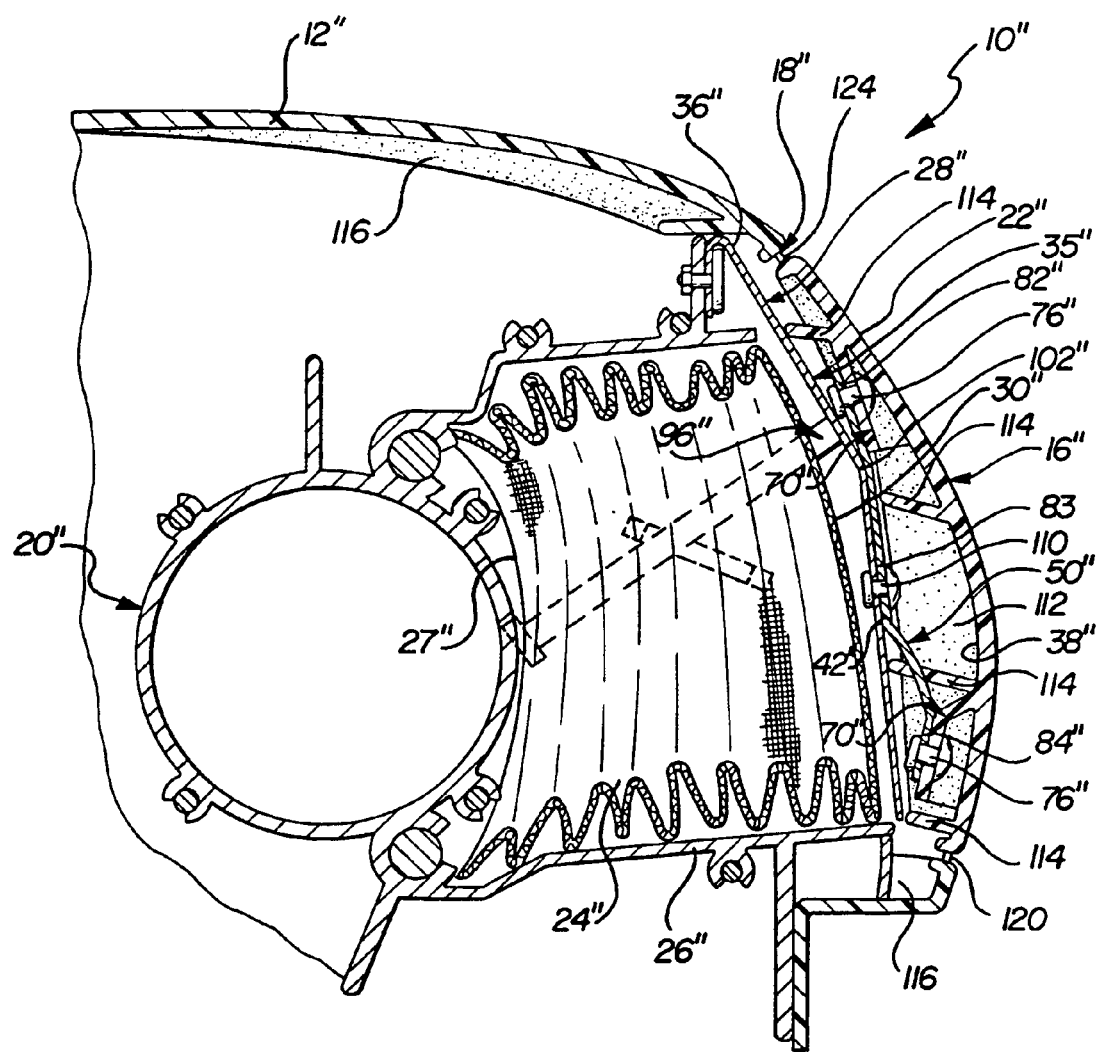
FIG. 10 is a cross-sectional view of the passive restraint system of FIG. 9 taken along line 10—10 of FIG. 9.
Figure 11:
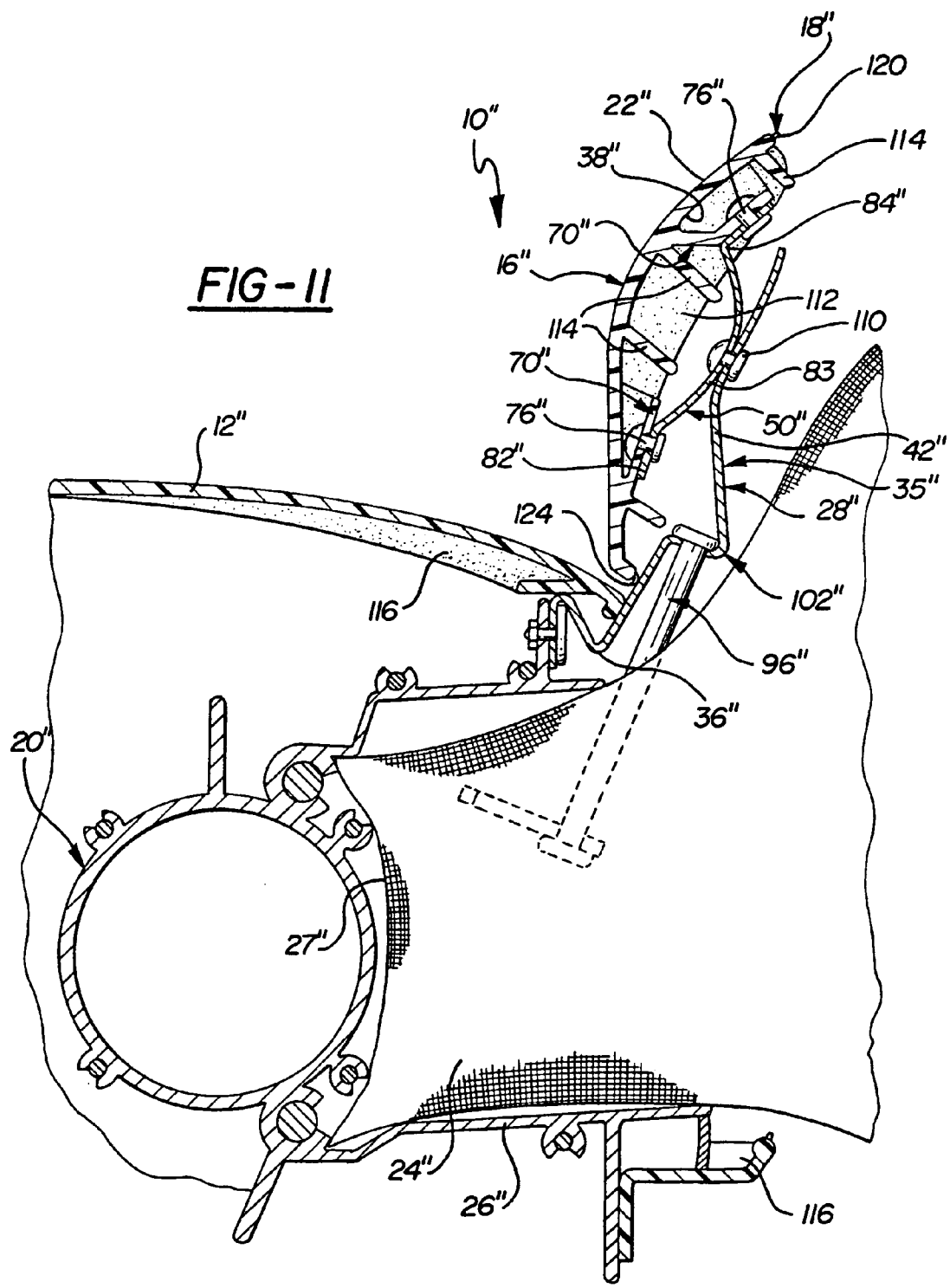
FIG. 11 is a cross-sectional view of the passive restraint system of FIG. 9 taken along line 10—10 of FIG. 9 during air bag inflation.

According to the third embodiment of the invention shown in FIGS. 9–11, the frangible marginal edge 18" defines the entire perimeter of the air bag deployment door 16". In other words, the frangible marginal edge 18" extends completely around the air bag deployment door 16" in an unbroken circuit as is best shown in FIG. 9. A pair of flexible tethers, representatively indicated at 50" in FIGS. 10 and 11, is fastened between the air bag deployment door 16" and the reaction plate 28". Each tether 50" includes an inner end portion 82" fastened to the door 16", an outer end portion 84" fastened to the door 16" and a middle portion 83 fastened to the reaction plate 28" between the second hinge line 102" and the reaction plate outer marginal edge 32". The middle portion 83 of each tether 50" is disposed approximately midway between the inner 82" and outer 84" end portions of each tether 50".

The air bag deployment door 16" includes only four of the fastener brackets 70" disposed in a rectangular pattern as shown in FIG. 9. The inner end portion 82" and outer end portion 84" of each tether 50" are fastened to the attachment surface of one of the four fastener brackets 70" by rivets 76" as shown in FIGS. 10 and 11. As is also shown in FIGS. 10 and 11, the middle portion 83 of each tether 50" is fastened to the reaction plate 28" between the second hinge line 102" and the reaction plate outer marginal edge 32" by a rivet 110.

As shown in FIGS. 9–11, nine vertical door ribs 112 extend integrally inward from the door inner surface 38" to a point adjacent the reaction plate 28". 24 short horizontal door ribs 114 connect adjacent vertical door ribs 112 to form a rectangular grid pattern best shown in FIG. 9. As best shown in FIG. 9, a plurality of vertical 116 and horizontal 118 panel ribs also extend integrally inward from an inner surface of the vehicle panel 12" adjacent the frangible marginal edge 18" of the door perimeter and are spaced apart around the door perimeter. The door ribs 112, 114 and panel ribs 116, 118 stiffen the door 16" and vehicle panel 12" against air bag opening shock and help concentrate opening forces along the frangible marginal edge 18" between the panel 12" and the door 16X. The door ribs 112, 114 and panel ribs 116, 118 are integrally formed with the door 16" and the vehicle panel 12" as a single unitary piece by injection molding.

In practice, when the air bag inflates it forces the reaction plate 28" to bend outward and upward around the first 36" and second 102" horizontal hinge lines. As the reaction plate 28" pivots outward it concentrates the inflation force along a lower edge portion 120 of the frangible door edge 18". This helps to predictably separate the door 16" from the vehicle dash panel 12" by tearing first along a lower edge portion 120 of the marginal edge 18" of the door 16" then allowing the tear to propagate up two side edge portions 122 of the door edge 18". The tear then propagates from the side edge portions 122 inwardly along an upper edge portion 124 of the marginal door edge 18" until the door 16" completely separates from the vehicle dash panel 12". Because the two tethers 50" connect the door 16" directly to the reaction plate 28", they prevent the door 16" from flying free. Similar to the second embodiment, the stop members 96" of the third embodiment limit how far the reaction plate 28" can bend, leaving the reaction plate 28" in a generally vertical position. Unlike the second embodiment, however, the upwardly-bent reaction plate 28" and the tethers 50" of the third embodiment hold the air bag deployment door 16" away from vehicle occupants. Alternatively, tearing may occur along the lower edge portion 120, side edge portions 122 and upper edge portion 124 virtually simultaneously.

In other embodiments, in place of the pin and slot arrangement described for the stop member above, any one of a number of different configurations may be employed to arrest reaction plate 28 travel in a position to prevent an air bag door 16 from returning to its original position.

A fourth embodiment of an inflatable restraint assembly is generally shown at 10s in FIGS. 12–16. Reference numerals with the suffix "S" in FIGS. 12–16 indicate alternative configurations of elements that also appear in the third embodiment. Where portions of the third embodiment description use reference numerals to refer to the figures, we intend those portions to apply equally to elements designated by the suffix "s" in FIGS. 12–16.

Figure 12:
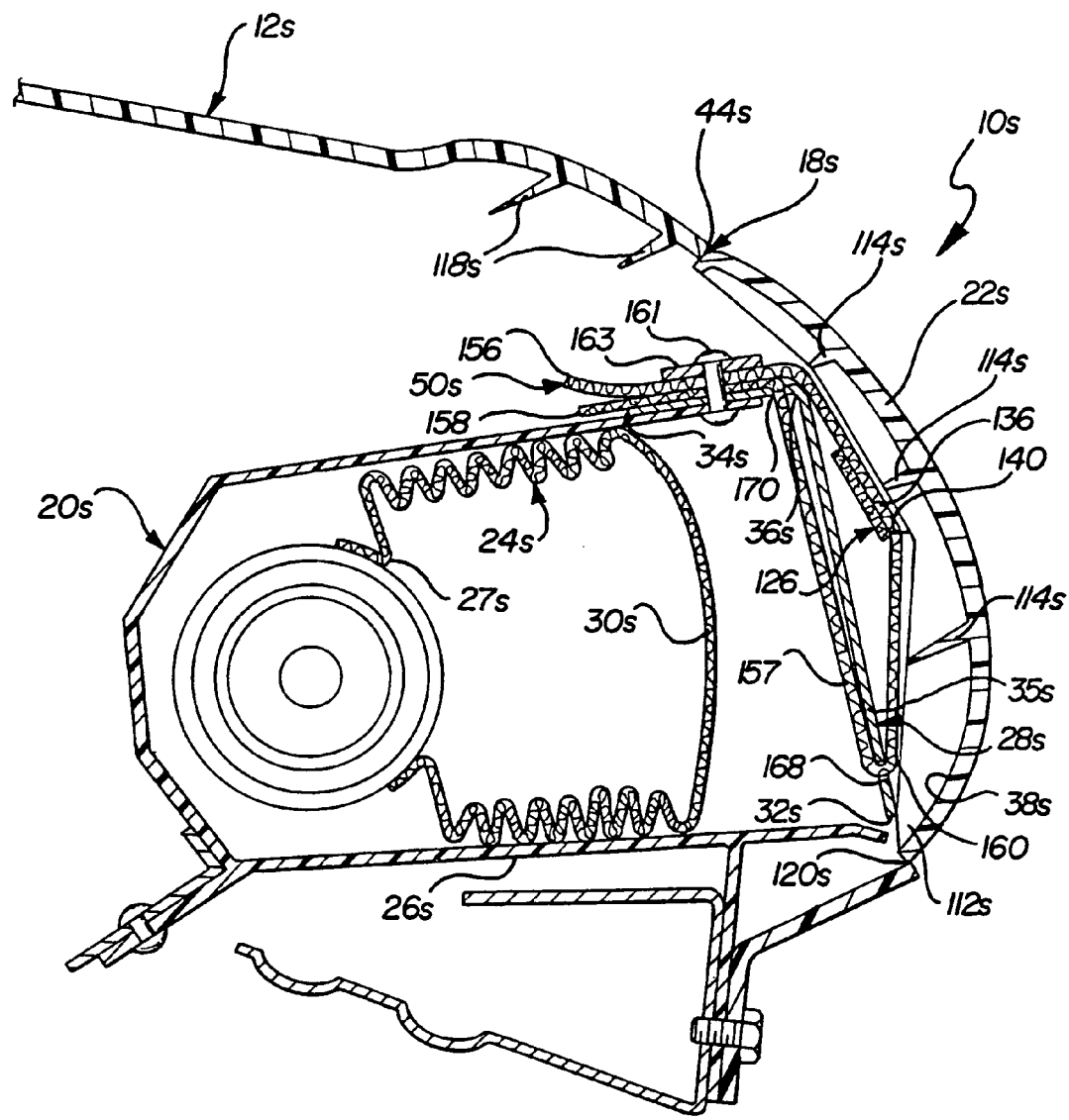
FIG. 12 is a first cross-sectional view of a fourth passive restraint system constructed according to the present invention.
Figure 13:
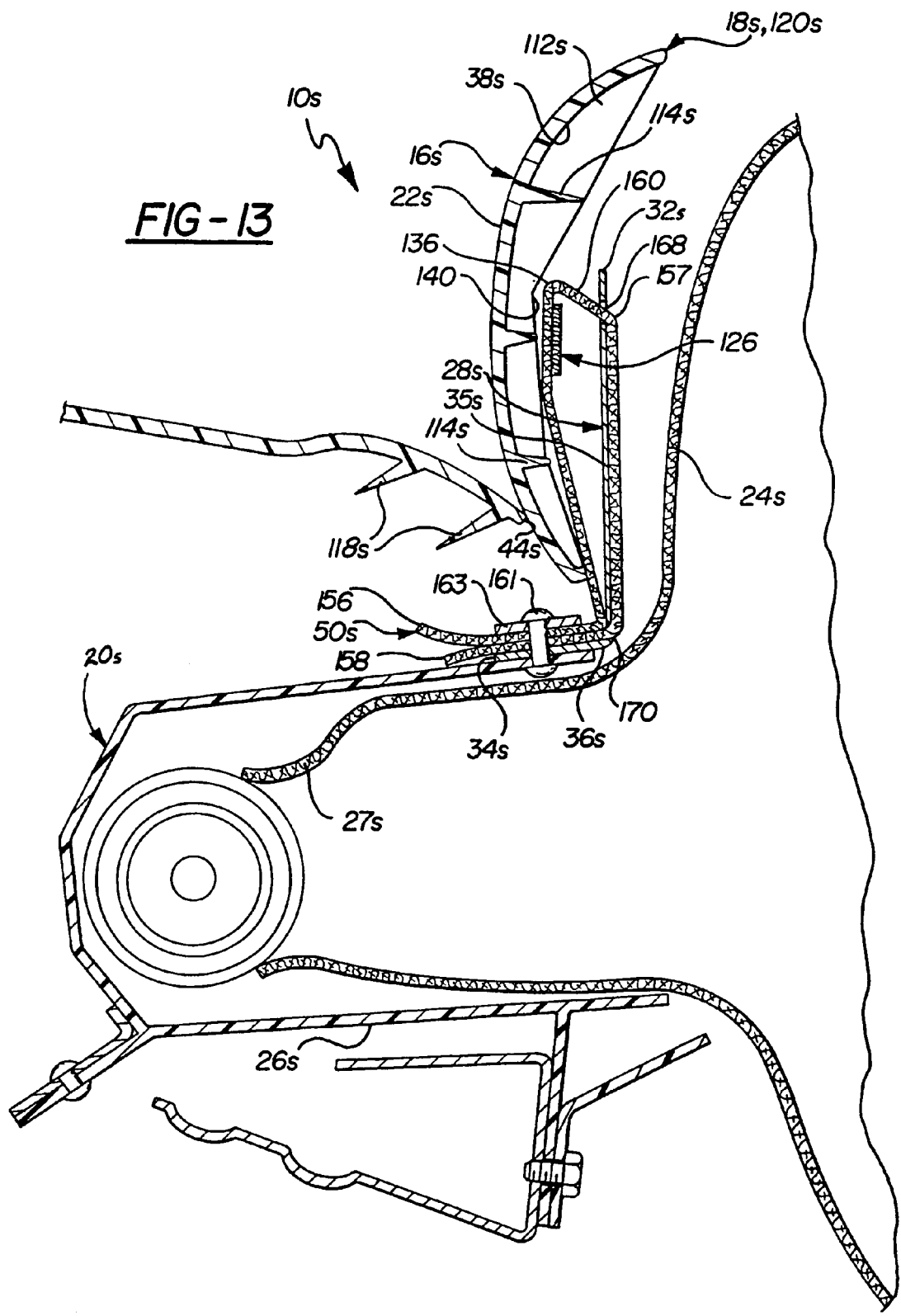
FIG. 13 is a cross-sectional view of the passive restraint system of FIG. 12 during air bag inflation.

The inflatable restraint assembly generally indicated at 10s includes first and second vertically-disposed elongated flexible nylon tethers, generally indicated at 50s, 51s in FIG. 16, and representatively indicated at 50s in FIGS. 12 and 13. The tethers 50s, 51s slidably engage the door 16s rather than being fixed to the door 16s as disclosed in the description of the third embodiment. The apparatus 10s includes a flat, elongated flexible nylon fabric strap, generally indicated at 126 in FIGS. 12–16. The strap 126 has a length extending between two strap ends and is horizontally disposed flat against the door 16s. As is best shown in FIG. 16, the strap 126 is fastened to the door 16s at first, second, third and fourth spaced attachment points 128, 130, 132, 134.

Each flexible tether 50s, 5 is includes a tether loop, representatively shown at 157 in FIGS. 12 and 13 and at 157 and 159, respectively, in FIG. 16. The loop portion 157 of each tether 50s, 51s extends from at least one common tether loop attachment portion. In the present embodiment, the tether loop attachment portions each comprise first and second tether loop ends, representatively shown at 156, 158 in FIGS. 12 and 13. Fasteners 161 extend through a strap retention member 163, both tether loop ends 156, 158, the reaction plate 28s and the air bag dispenser 20s. The fasteners 161 fasten the tether loop ends 156, 158 together, and fasten the loop ends 156 and reaction plate 28s to the air bag dispenser 20s adjacent the reaction plate inner edge 34s. In other embodiments the first tether loop end 156 of each tether 50s, 51s may be attached at a different location than the second tether loop end 158 of each tether 50s, 51s.

A middle portion 136 of the first flexible tether 50s slidably extends between the door 16s and the strap 126, perpendicular to the length of the strap 126, and passes between the first and second attachment points 128, 130. Likewise, a middle portion 138 of the second flexible tether 51s slidably extends between the door 16s and the strap 126, perpendicular to the length of the strap 126, and passes between the third and fourth attachment points 132, 134. In other words, the strap 126 holds the flexible tethers 50s, 51s against the door 16s while allowing the flexible tethers 50s, 51s to slide longitudinally through a pair of slots 140, 142. The slots 140, 142 are formed between the strap 126, the door 16s and the attachment points 128–134 as best shown in FIGS. 12, 13 and 16.

Figure 14:
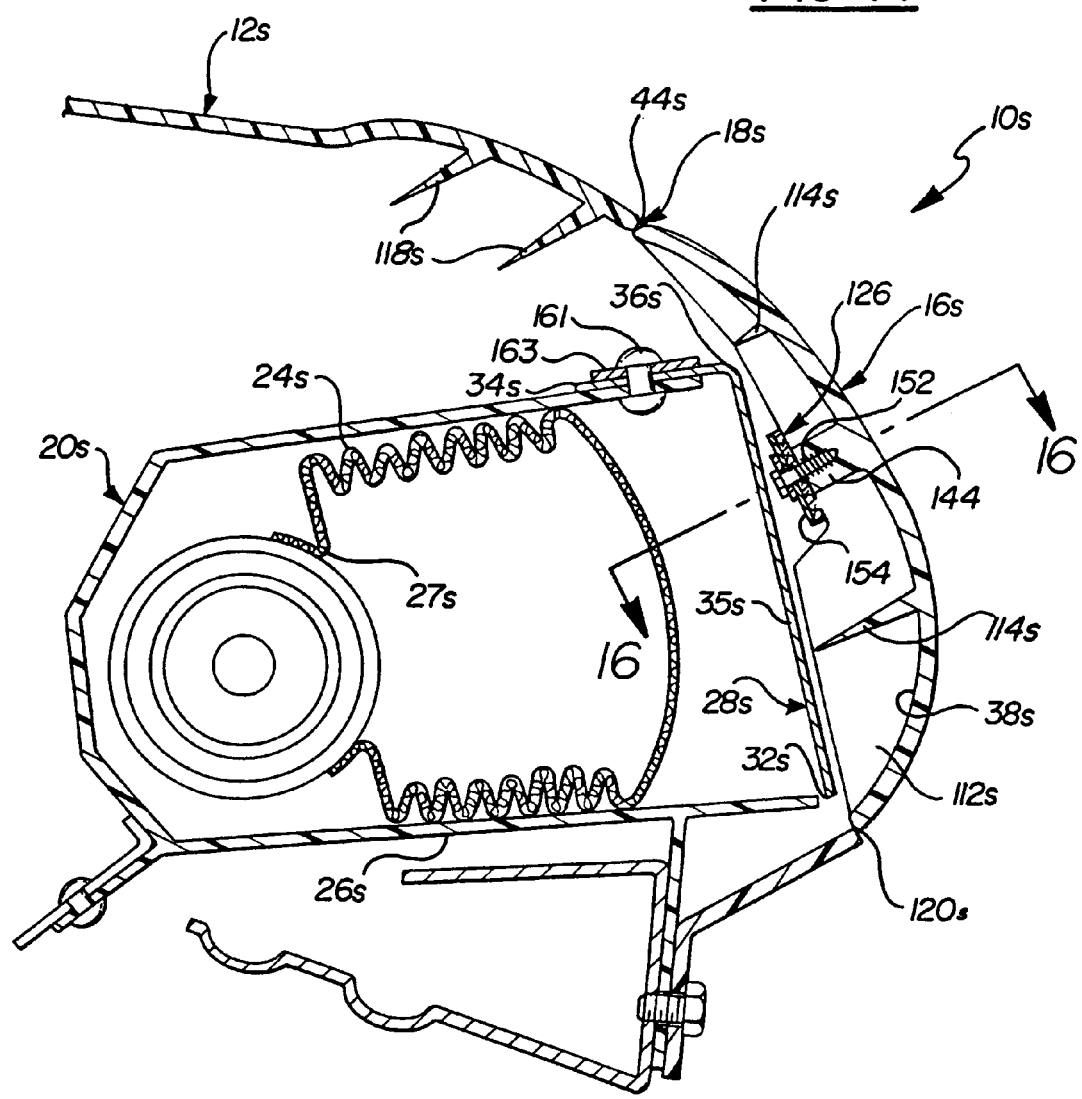
FIG. 14 is a cross-sectional view of the passive restraint system of FIG. 12 taken through a screw boss of the system.
Figure 15:
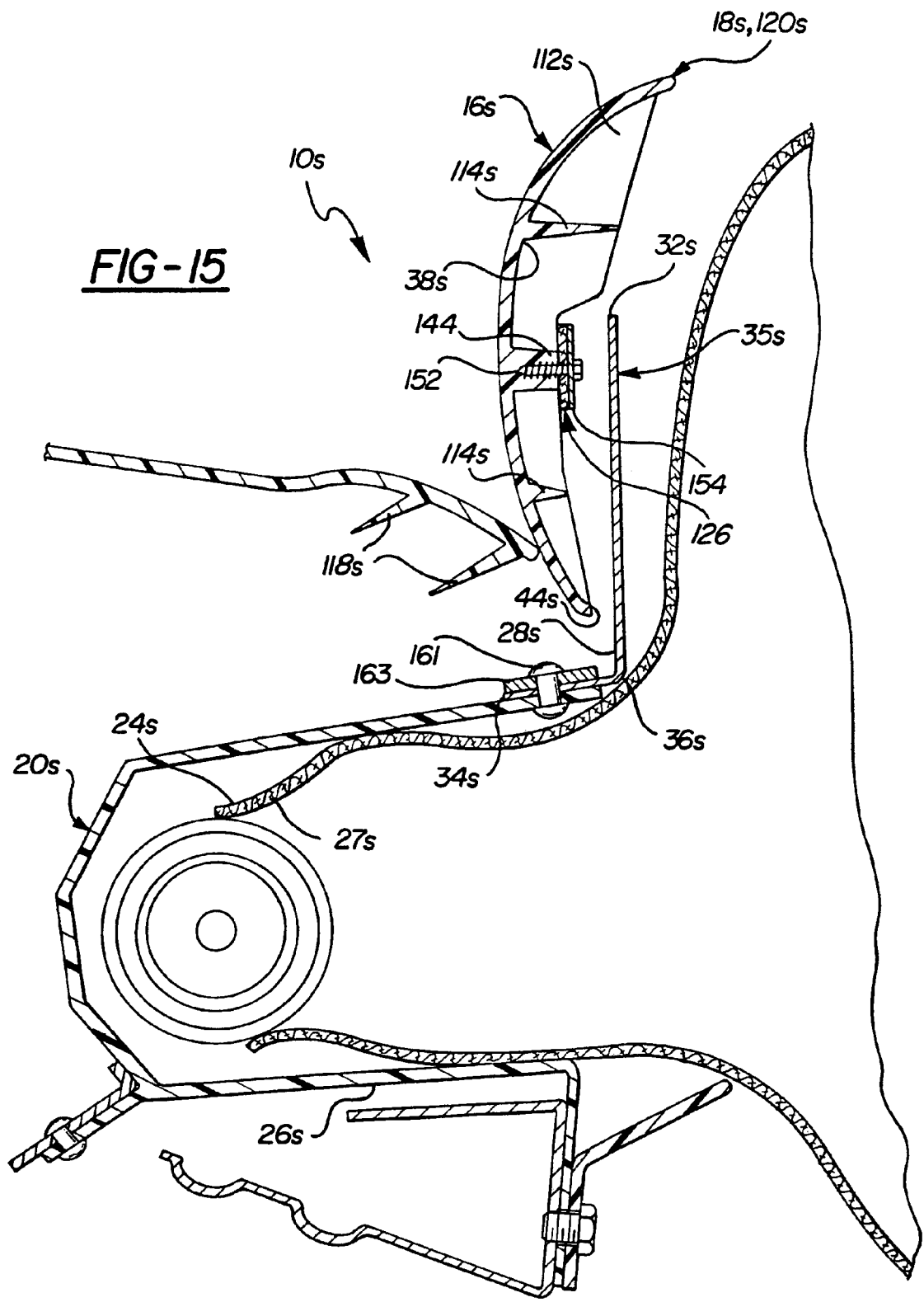
FIG. 15 is a cross-sectional view of the passive restraint system of FIG. 12 taken through a screw boss of the system during air bag inflation.

The apparatus (10s) includes first, second, third and fourth screw bosses, shown at 144, 146, 148 and 150 in FIG. 16 and representatively shown at 144 in FIGS. 14 and 15. The bosses 144–150 extend integrally inward from a door inner surface 38s to the respective first, second, third and fourth attachment points 128–134. The screw bosses 144–150 are integrally formed with the door 16s as a unitary piece and are aligned horizontally along the door inner surface 38s. As shown in FIGS. 14–16, screw-type fasteners 152 extend through respective annular washers 154 and attach the strap 126 to the respective first, second, third and fourth bosses 144–150 by threadedly engaging the bosses 144–150.

As with the first and second embodiment, a generally rectangular reaction plate 28s is attached to an air bag dispenser assembly 20s along a reaction plate inner edge 34s, as shown in FIGS. 12–15. An outer portion 35s of the reaction plate 28s is outwardly pivotable away from the air bag dispenser assembly 20s by bending the reaction plate 28s along a hinge line 36s extending parallel to the reaction plate inner edge 34s. Prior to air bag inflation, the reaction plate 28s is bent at the hinge line 36s approximately 850 downward from horizontal. Following air bag inflation, the reaction plate 28s is bent approximately 850 upward from horizontal.

Each flexible tether 50s, 51s has a length extending between first and second tether ends, representatively shown at 156 and 158, respectively, in FIGS. 12 and 13. The first and second tether ends 156, 158 of each flexible tether 50s, 51s are fastened to the air bag dispenser assembly 20s adjacent the reaction plate inner edge 34s forming tether loops as shown in FIGS. 12 and 13. A portion 160 of the first flexible tether 50s slidably engages the outer portion 35s of the reaction plate 28s. Likewise, a corresponding portion of the second flexible tether 51s slidably engages the outer portion 35s of the reaction plate 28s at a point spaced laterally from the point where the first flexible tether 50s engages the outer portion 35s of the reaction plate 28s.

As shown in FIGS. 12 and 13, the first flexible tether 50s slidably extends through a first opening or slot 168 in the outer portion 35s of the reaction plate 28s adjacent a reaction plate outer marginal edge 32s. Likewise, the second flexible tether 51s slidably extends through a second slot, spaced laterally from the first slot along the reaction plate outer marginal edge 32s.

According to the fourth embodiment, when the air bag inflates, it forces the outer portion 35s of the reaction plate 28s to bend outward and upward around the horizontal hinge line 36s. The outer portion 35 s of the reaction plate 28s will then continue pivoting, due to angular momentum acquired from air bag deployment, into a position angularly spaced from the air bag deployment path and more than 45 degrees from its position before air bag deployment. The angularly spaced position of the outer portion 35 s of reaction plate is best shown in FIGS. 13 and 15. As the reaction plate 28s pivots outward, it concentrates the inflation force along a lower edge portion 120s of the frangible door edge 18s. This begins tearing that advances around the entire door edge 18s and separates the door 16s from the vehicle dash panel 12s. Similar to the third embodiment, the first and second tethers 50s, 51s of the fourth embodiment connect the door 16s to the reaction plate 28s to decelerate and prevent the door 16s from flying free.

Unlike the third embodiment, however, the tethers 50s, 51s of the fourth embodiment allow the door 16s to slide along a portion of their lengths. The sliding prevents the loads exerted by door 16s on the tethers 50s, 51s from concentrating at any one attachment point along the tethers 50s, 51s. The sliding also spreads the door arresting shock over time, reducing the probability of the door 16s fracturing or pulling loose from the tethers 50s, 51s.

Although air bag inflation eventually causes the door to tear free along an upper edge portion 44s of the door perimeter 18s, the upper edge portion 44s initially acts as a living hinge. The door 16s initially swings outward and upward about the upper edge portion 44s while remaining in direct contact with the reaction plate 28s.

During this initial opening swing, the plate 28s and the door 16s pivot around different axes because the upper edge portion 44s is offset from the reaction plate hinge line 36s. Because the upper edge 44s and hinge line 36s are offset, and because the tethers 50s, 5 is are slidably engaged with the plate 28s and the door 16s, the tethers 50s, 51s are able to hold the plate 28s and door 16s in close proximity to one another without arresting or overly restricting their movement.

The tethers 50s, 51s offer little resistance from the time the door 16s is initially forced open until the door 16s and reaction plate 28s reach an approximately horizontal position. However, when the reaction plate 28s reaches this horizontal position, the door 16s tears loose from the upper edge 44s and is arrested by the tethers 50s, 51s. As the reaction plate 28s moves through the horizontal and continues to swing upward toward its fully open near-vertical position, the reaction plate 28s rapidly decelerates. As the reaction plate 28s decelerates, the tethers 50s, 51s allow the door 16s to swing upwards, absorbing energy as the tethers 50s, 51s slide through the slots 168, 170 in the reaction plate and through the gap between the horizontal strap 126 and the door 16s.

Preferably, the tethers 50s, 51s and horizontal strap 126 are both made of nylon fabric. However, any one of a number of other suitable materials may be used to construct the tethers 50s, 51s and/or the strap 126, to include thin metal straps. In addition, a slotted insert may be used, in place of a strap, to slidably retain the tethers 50s, 51s. In other words, the tethers 50s, 51s; strap 126; reaction plate 28s; door 16s; and offset pivot points 36s, 44s make up a compound-swing tether system that eliminates lash and is absorbs door opening forces.

Other possible variations on the fourth embodiment include the strap 126 being made of some flexible material other than fabric. Moreover, the strap 126 need not be flat, but may be of any cross-sectional shape, e.g., a cord-like structure having a circular cross-section. The reaction plate 28s and/or tether ends 156, 158 could be attached to the vehicle panel 12s rather than the air bag dispenser 20s along the reaction plate inner edge 34s. In addition, in other embodiments the tethers 50s, 51s need not slidably engage the reaction plate 28s. Instead, the tethers 50s, 5 is may be fixed to the reaction plate 28s at some point along their respective lengths.

Figure 31:
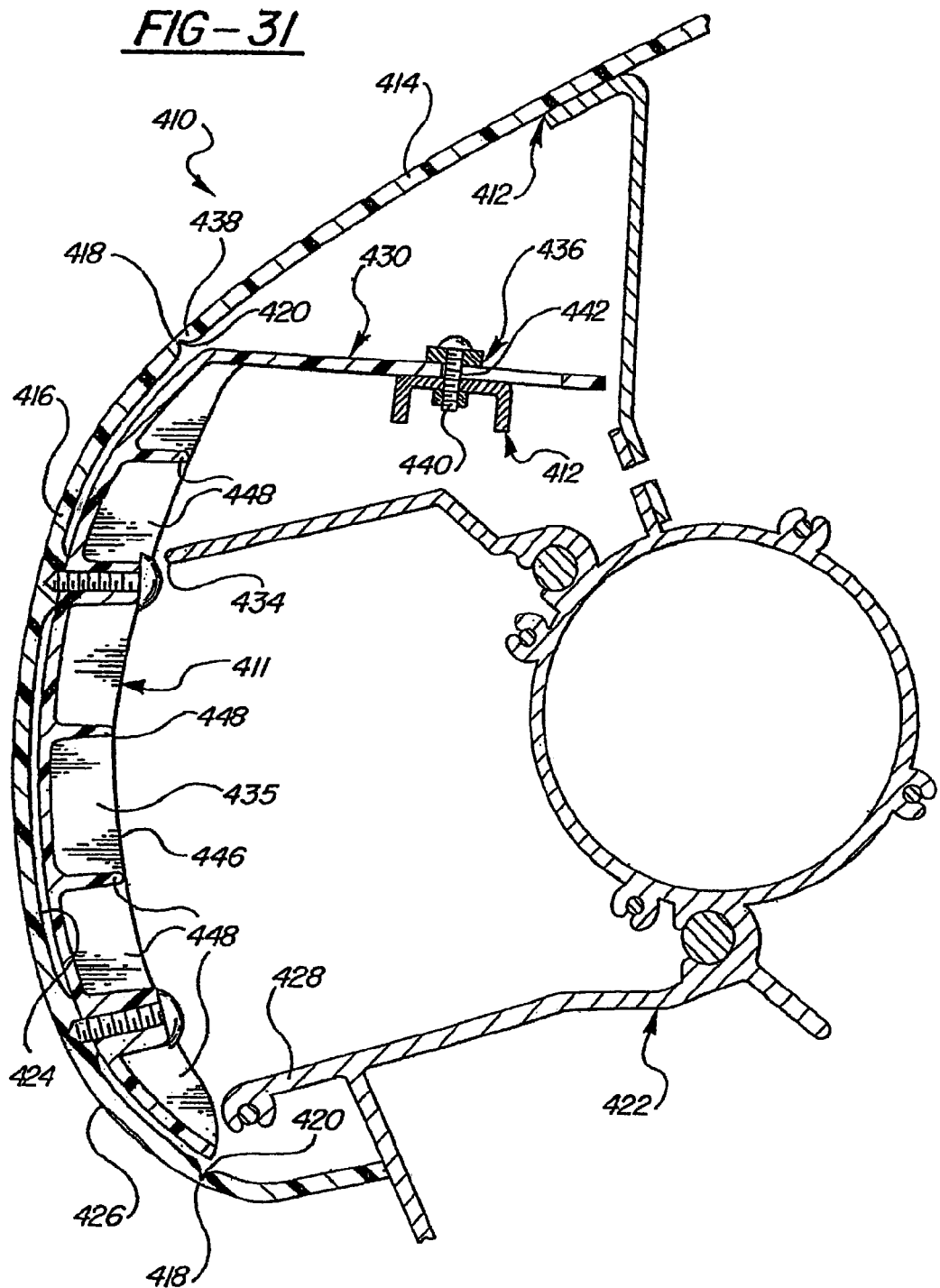
FIG. 31 is a side cross-sectional view of an air bag canister assembly having a plastic reaction plate constructed according to the invention and supported by an integral slotted tether strap.

An inflatable restraint assembly for passengers in automotive vehicles having a reaction plate constructed of injection-molded plastic according to the present invention is generally indicated at 410 in FIG. 31. The reaction plate is generally indicated at 411 in FIGS. 31 and 32. An inflatable restraint assembly having an alternative reaction plate attachment means constructed according to the invention is generally indicated at 410' in FIG. 33. The reaction plate is generally indicated at 411' in FIGS. 33 and 34. Reference numerals annotated with a prime symbol (') in FIGS. 33 and 34 indicate alternative configurations of elements that also appear in the embodiment of FIGS. 31 and 32. Where a portion of the description uses a reference numeral to refer to the figures, we intend that portion of the description to apply equally to elements designated by primed numerals in FIGS. 33 and 34.

Figure 32:
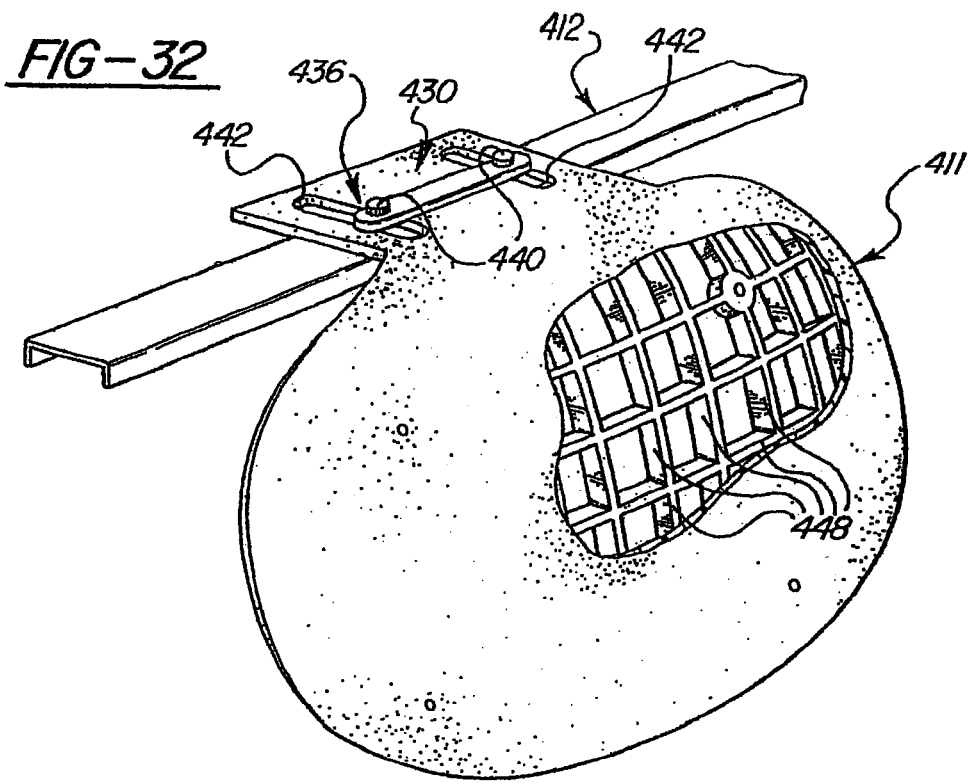
FIG. 32 is a front perspective view of the reaction plate of FIG. 31.

The assembly 410 includes a support structure generally indicated at 412 in FIGS. 31 and 32. The support structure 412 includes an interior vehicle panel or retainer panel shown at 414 in FIG, 31, and an air bag deployment door shown at 416 in FIG. 31. The air bag deployment door 416 is integrally formed in the retainer panel 414 and includes a perimeter 418, at least a portion of which is defined by a frangible marginal edge or tear seam 420. The support structure 412 also includes an air bag dispenser shown at 422 in FIG. 31. The air bag dispenser 422 is supported adjacent a door inner surface 424 opposite a door outer surface 426. An air bag (not shown) is supported in an air bag receptacle or canister 428 of the air bag dispenser 422. The air bag has an inner end operatively connected to the air bag dispenser 422 and an outer end disposed adjacent the air bag deployment door 416. The air bag dispenser 422 is configured to direct air bag deployment along a deployment path through the retainer panel 414.

The reaction plate 411 is disposed between the air bag and the air bag deployment door 416 and is configured to receive the force of air bag deployment from the air bag dispenser 422 and to direct and distribute that force against the door inner surface 424 to at least partially separate the door 416 from the vehicle panel 414 along the frangible marginal edge 420 of the door 416. The reaction plate 411 has an integral tether 430 connected between the support structure 412 and an outwardly pivotable panel portion 435 of the reaction plate 411. The tether 430 is configured to bend under the force of air bag inflation allowing the pivotable panel portion 435 to pivot into a position angularly spaced from the air bag deployment path. The pivotable panel portion 435 of the reaction plate 411 is configured to close a canister opening 434 of the air bag canister 422. The reaction plate 411 comprises a plastics material.

The reaction plate 411 may be molded from a thermoplastic elastomer (TPE) to enable the reaction plate 411 to meet cold performance requirements. The use of TPE allows the reaction plate 411 to meet these standards because TPE's are generally more ductile at low temperatures or have lower glass transition temperatures ($T_g$) than the plastics used for the retainer panel 414. However, in other embodiments the reaction plate 411 may be made of any one of a number of other suitable thermoplastic or thermoset plastics known in the art.

The integral tether or hinge 430 is connected to the support structure 412 by a sliding hinge 436. The sliding hinge 436 is configured to allow the reaction plate 411 to slide outwardly (rearwardly in the case of a dash-mounted assembly) when a deploying air bag forces the reaction plate 411 to pivot outward. Because it allows the reaction plate 411 to move outward as it pivots upward the sliding hinge 436 moves the reaction plate 411 into a position where it will not bind mechanically against a portion of the vehicle panel 438 that is disposed directly above and in the path of the opening reaction plate 411.

The integral tether 430 is connected to the support structure 412 by two fasteners 440. The sliding hinge 436 includes two slotted fastener holes 442 in the integral hinge 430 to receive the fasteners. The slotted fastener holes 442 are configured to slidably receive the shaft portions of each fastener 440. When a deploying air bag impacts a back surface 446 of the reaction plate 411 and begins pushing the reaction plate 411 and door 416 outward the slotted fastener holes 442 allow the integral tether 430 to slide outwardly relative to the fasteners 440.

The pivotable panel portion 435 of the reaction plate 411 includes integral ribs shown at 448 in FIGS. 31 and 32. The integral ribs 448 are configured to stiffen the reaction plate 411 against deformation caused by uneven impact forces from a deploying air bag. The integral ribs 448 extend integrally inward from an inner surface 446 of the pivotable panel portion 435 of the reaction plate 411. As is best shown in FIG. 32 the integral ribs 448 include vertical and horizontal intersecting ribs in a rectangular matrix or egg crate pattern.

Figure 34:
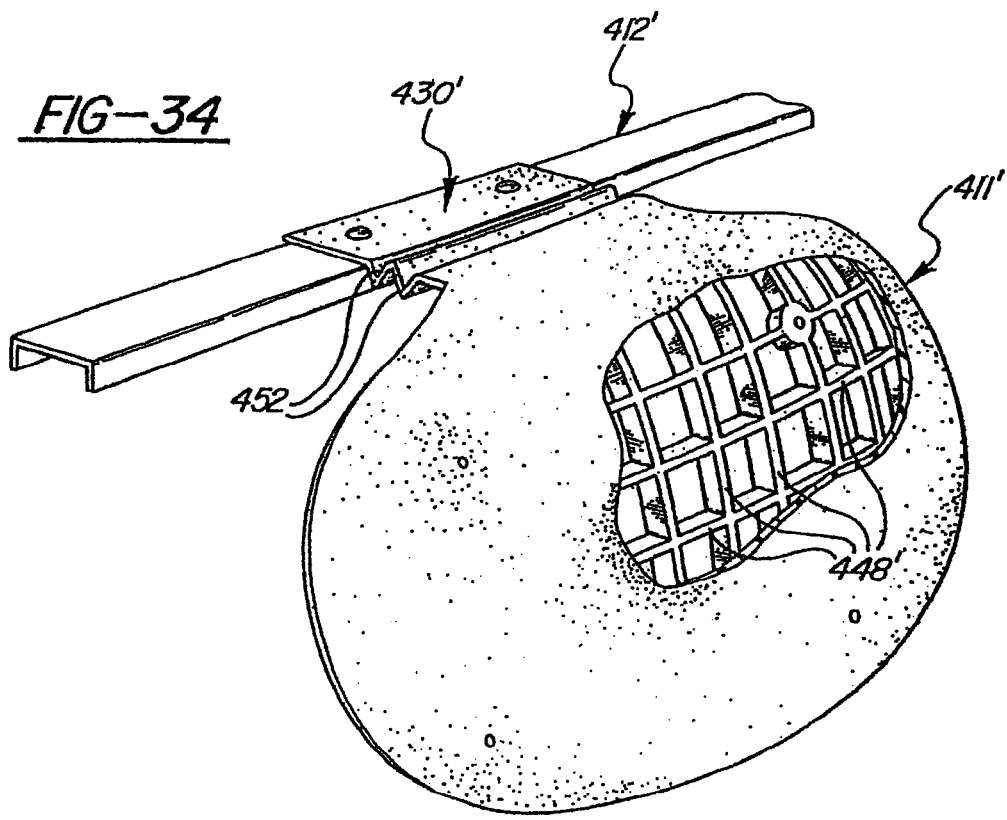
FIG. 34 is a front perspective view of the reaction plate of FIG. 33.

According to the embodiment of FIGS. 33 and 34, the integral tether 430' includes fanfolds 452 configured to allow the tether 430" to elongate when a deploying air bag forces the reaction plate 411' outward (again, rearward in the case of a dash-mounted assembly). The fanfolds 452 may be integrated into the molding of the reaction plate 411' thus eliminating the mechanical bind described above with regard to the embodiment of FIGS. 31 and 32, without having to form and assemble a sliding mechanism such as that shown in the embodiment of FIGS. 31 and 32. In other embodiments, the tether 430 may include an accordion or bellows-type configuration rather than the fanfolds 452 described above.

Figure 18:
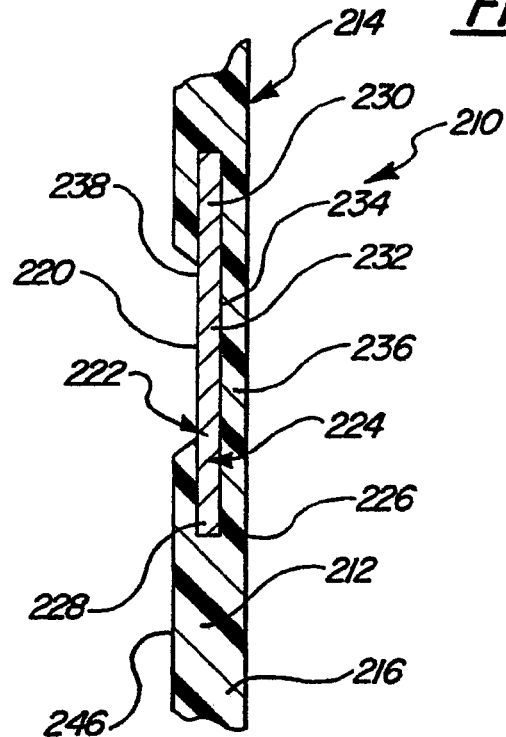
FIG. 18 is a cross-sectional view of an air bag door hinge constructed according to the present invention.
Figure 19:
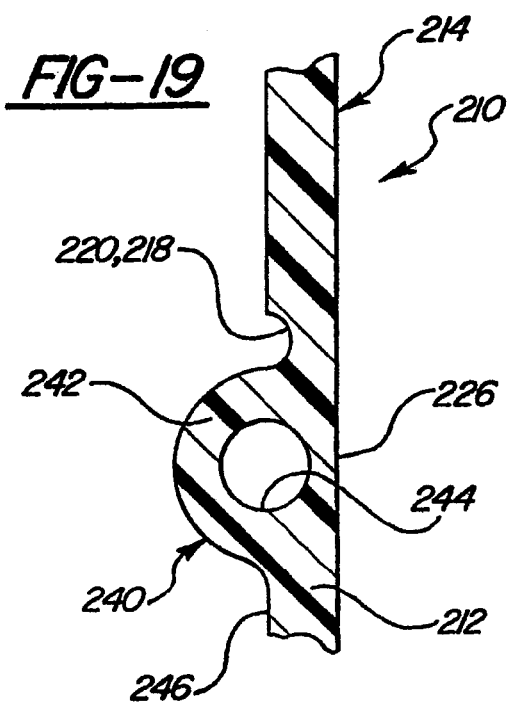
FIG. 19 is a cross-sectional view of a break-away/tear seam of a first embodiment of an integral air bag door and instrument panel constructed according to the invention.

A panel and integral air bag door assembly having an alternative hinge and tear seam configuration is generally shown at 210 in FIGS. 18, 19 and 22. A panel and integral air bag door assembly having another alternative tear seam configuration is shown at 210' in FIGS. 20 and 23 and a panel and integral air bag door assembly having yet another alternative tear seam configuration is shown at 210" in FIGS. 21 and 24. Reference numerals annotated with a prime symbol (') in FIGS. 20 and 23 and with a double-prime symbol (") in FIGS. 21 and 24 indicate alternative configurations of elements that also appear in the embodiment of FIGS. 18, 19 and 22. Where a portion of the description uses a reference numeral to refer to the figures, we intend that portion of the description to apply equally to elements designated by primed numerals in FIGS. 20 and 23 and double-primed numerals in FIGS. 21 and 24.

FIGS. 18, 19 and 22 show the closed position of an air bag door 212 integrally formed in an automotive instrument panel 214 according to the first embodiment. The composite air bag door 212 and instrument panel 214 comprises a first plastic material 216 and includes a frangible marginal edge 218 that defines the air bag door 212. The frangible marginal edge 218 is constructed to insure that the air bag door 212 breaks and/or tears open in a generally predictable way. The air bag door 212 is movable from the closed position to provide a path for an air bag to deploy through. The air bag door 212 is movable out of the closed position by causing the air bag door 212 to at least partially separate from the instrument panel 214 along a door perimeter 220 that is at least partially defined by the frangible marginal edge 218. The remainder of the door perimeter 220 is defined by an integral retaining structure in the form of a hinge 222. The hinge 222 is configured to preclude at least a portion of the air bag door 212 from departing the immediate vicinity of the instrument panel 214 during air bag deployment. The immediate vicinity of the instrument panel 214 is an area surrounding the instrument panel 214 that is spaced far enough from any passenger compartment occupant that no portion of the air bag door 212 can contact an occupant during air bag deployment. The hinge 222 allows the air bag door 212 to open when the air bag inflates but insures that the door 212 does not separate under the force of air bag deployment. The hinge 222 includes a hinge panel that is generally indicated at 224 in FIGS. 18 and 22. As is best shown in FIG. 18, the hinge panel 224 comprises a second material that is embedded at least partially within the first material 216 and spans the door perimeter 220. The second material may include any one or more of a number of suitable materials to include a thermoplastic rubber such as Santoprene®, glass matte, cloth or fabric and metal.

The hinge panel 224 is invisible as viewed from an outer class-A surface 226 of the instrument 214. As is best shown in FIG. 18, a first end 228 of the hinge panel 224 is embedded in a portion of the first material 216 that forms the door 212. A second end 230 of the hinge panel 224 is embedded in a portion of the first material 216 that forms the instrument panel 214. A mid portion 232 of the hinge panel 224 is disposed between the first and second ends 228, 230. As is best shown in FIG. 18, the mid portion 232 of the hinge panel 224 has a hinge panel outer surface 234 covered with a portion 236 of the first material 216 that forms the outer class-A surface of the door 212 and instrument panel 214. The portion 236 of the first material that covers the outer surface 234 of the mid portion 232 of the hinge panel 224 continues the outer class-A surface 226 over the hinge panel 224 and between the door 212 and instrument panel 214, concealing the presence of the hinge panel 214 and the dividing line or seam 220 between the door 212 and instrument panel 214. The mid portion 232 also has an exposed hinge panel inner surface shown at 238 in FIGS. 18 and 22. The exposed hinge panel inner surface 238 is disposed opposite the hinge panel outer surface 234. The hinge panel inner surface 238 is left exposed to promote bending along the hinge 222.

As shown in FIGS. 19 and 22, the frangible marginal edge 218 comprises a region of reduced thickness outlining the integral air bag door 212 in the instrument panel retainer 214. The frangible marginal edge 218 guides tearing and/or breakage during air bag deployment. In addition, a tubular channel (sometimes referred to as a gas structural channel) is generally indicated at 240 in FIGS. 19 and 22. The tubular channel 240 is disposed on the air bag door 212 along the frangible marginal edge 218. The tubular channel 240 comprises a tube, shown at 242 in FIG. 19, having a generally circular cross-section. The tube 242 is partially defined by an elongated hemispherical wall 244 that integrally extends from an inner surface 246 of the air bag door 212. The hemispherical wall 244 and the air bag door 212 and the instrument panel 214 are formed together as a single unitary piece by gas-assisted injection molding as is described in greater detail below. The tubular channel 240 provides reinforcement and structure that creates a substantial strength differential with the door perimeter 220.

In other embodiments, the tubular channel 240 may have a tubular cross section that is other than circular and may extend integrally from the instrument panel 214 rather than the air bag door 212. In either case, the tubular channel 240 is disposed opposite the outer class-A surface 226 of the air bag door 212 and instrument panel 214. In this position the tubular channel 240 is hidden from vehicle occupants' view and helps to conceal the presence of the supplemental inflatable restraint system. As shown in FIG. 22, the channel 240 extends 2700 around rear and side edges of the air bag door 212. While a single "C-formed" door is shown in FIG. 22, the same approach can be used for "H-shaped" double doors, "X-shaped" doors, etc.

The panel and integral airbag door assembly 210' of FIGS. 20 and 23 include two tubular channels generally indicated at 240' and 248, respectively. The tubular channels 240', 248 are disposed adjacent and parallel to each other. The channels 240', 248 run astride and define an elongated gap 218' that defines an integral air bag door 212' in an instrument panel retainer 214'. The gap 218' also serves as a frangible marginal edge between the two structural channels 240', 248.

The panel and integral airbag door configuration of FIGS. 21 and 24 also include two tubular channels generally indicated at 240" and 248", respectively. The tubular channels 240", 248" are disposed adjacent and parallel to each other. The channels 240", 248" run astride and define an elongated gap 218" that defines an integral air bag door 212" in an instrument panel retainer 214". The gap 218" also serves as a frangible marginal edge between the two structural channels 240", 248". Unlike the panel and integral airbag door assembly 210' shown in FIGS. 20 and 23, the panel and integral airbag door assembly 210" shown in FIGS. 21 and 24 include an elongated groove, shown at 250 in FIGS. 21 and 24, disposed in an outer class-A surface 226" opposite the elongated gap 218". The elongated groove 250 further reduces the thickness of the plastic material where concealment of the presence of an air bag door for an inflatable restraint system is not a concern.

In practice, the hinge 222 of the inflatable restraint assembly may be constructed by first providing a mold configured to form the shape of the integral air bag door 212 and instrument panel 214. The hinge panel 224 comprising a sheet of the second material is then placed in the mold in a position spanning a region of the mold configured to form the door perimeter 220. The first material 216 is then introduced in molten form into the mold such that the hinge panel 224 is at least partially embedded in the first material 216. The first material 216 is then allowed to cure within the mold. Finally, the cured first material 216 and at least partially embedded hinge panel 224 are removed from the mold.

The tear seam 218 of the inflatable restraint assembly may be constructed according to the present invention by first providing a mold configured to form the shape of the integral air bag door 212 and instrument panel 214 and the tubular channel 240 or channels 240', 248; 240", 248". Resin is then injected into the mold. Gas is then injected into a portion of the resin disposed in a portion of the mold configured to form the tubular channel 240 or channels 240', 248; 240", 248". As the gas is injected it forms the tubular channel tube(s) 242 and helps propel resin into narrow mold regions along the tear seam 218. The resin is then allowed to cure within the mold before it is removed. The use of tubular channels to form tear seams has the advantage of providing relatively large tear-guide structures without using large amounts of material to create thick regions that would result in sink formation. If large amounts of material were used to thicken the panel on either side of the desired tear seam, shrinkage during curing would result in surface discontinuities in the form of depressions or "sinks".

Figure 25:
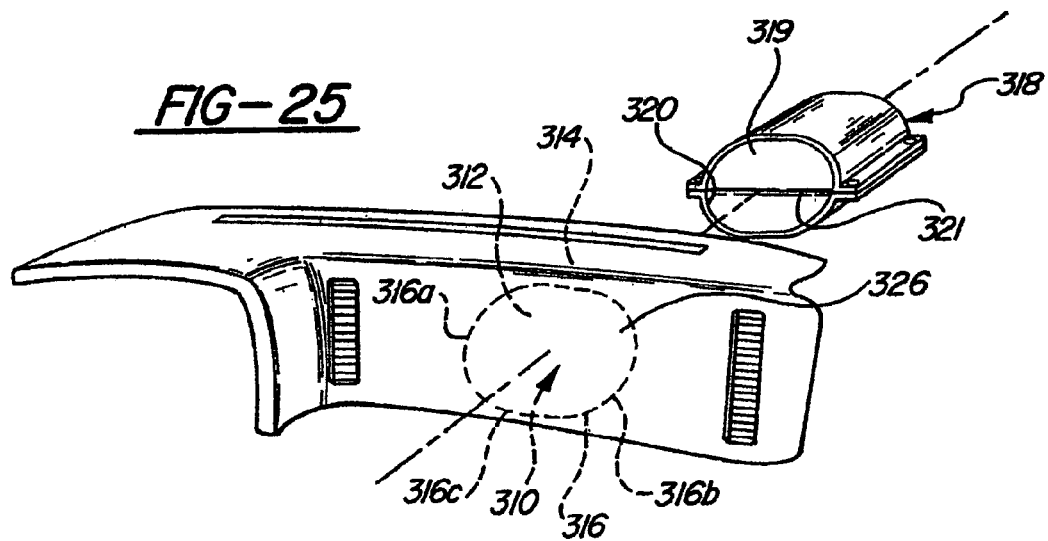
FIG. 25 is a front perspective view of an instrument panel including an air bag door integrally formed in an instrument panel retainer according to the invention and defined by a 360° tear seam.
Figure 26:
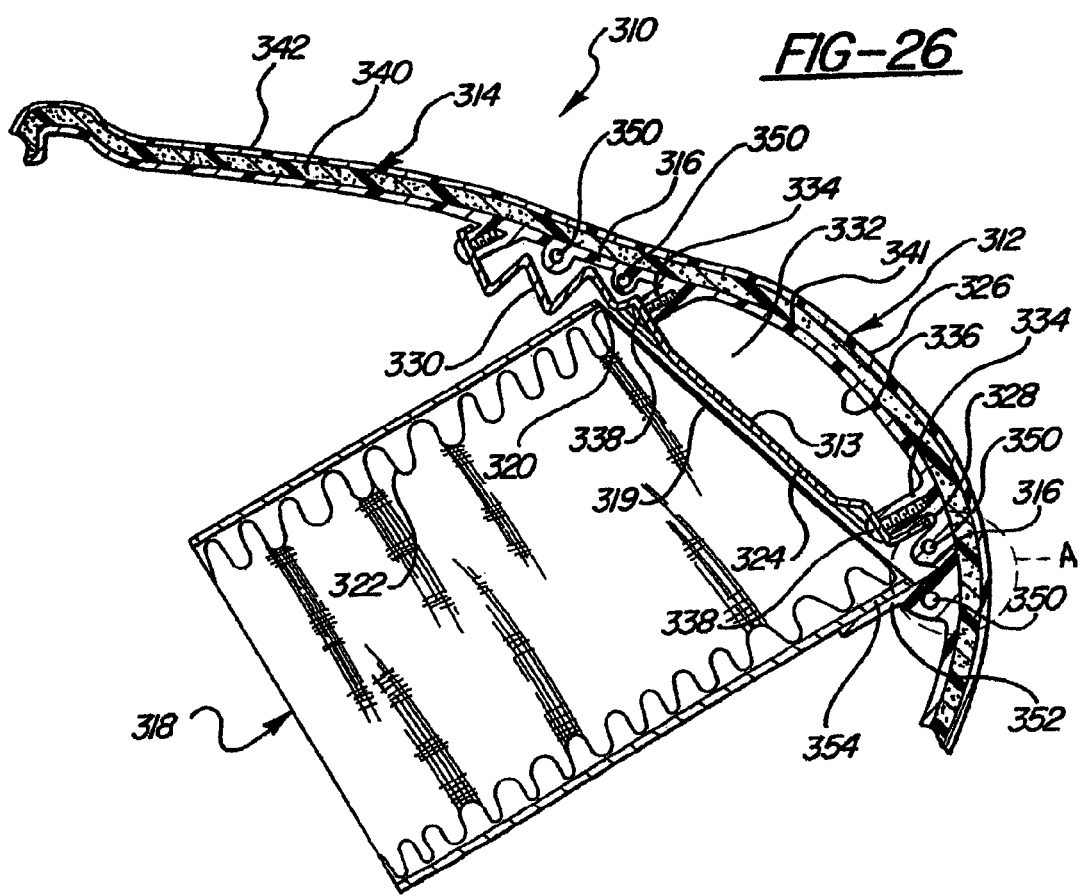
FIG. 26 is a side cross-sectional view of an air bag canister assembly constructed according to the invention and installed behind the instrument panel of FIG. 25.
Figure 27:
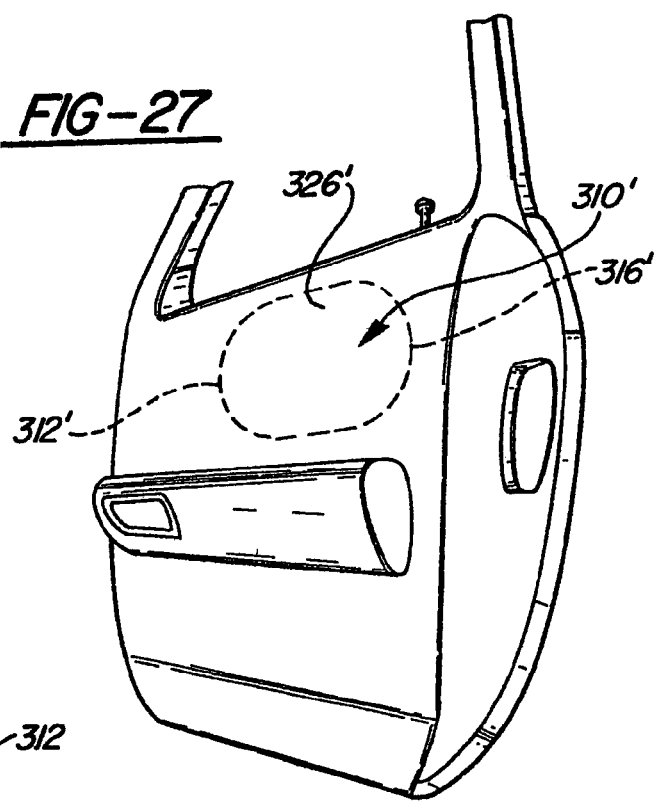
FIG. 27 is a perspective view of the air bag canister assembly of FIG. 26.
Figure 28:
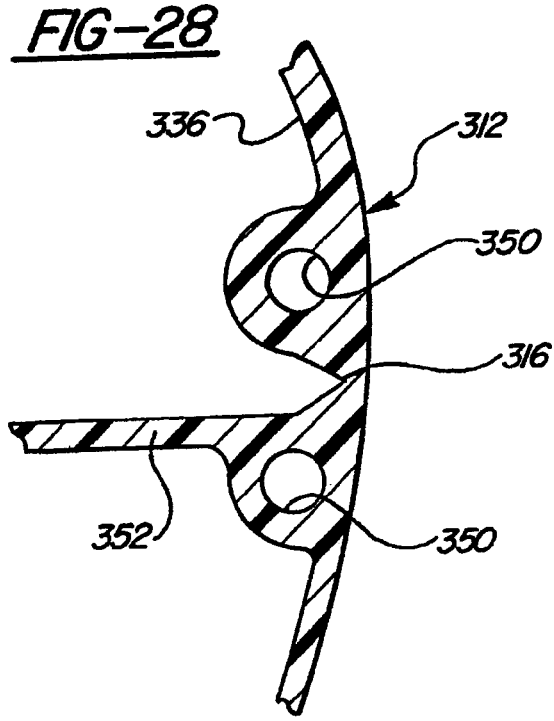
FIG. 28 is a magnified view of the regions in FIG. 26 bounded by Circle A.
Figure 29:
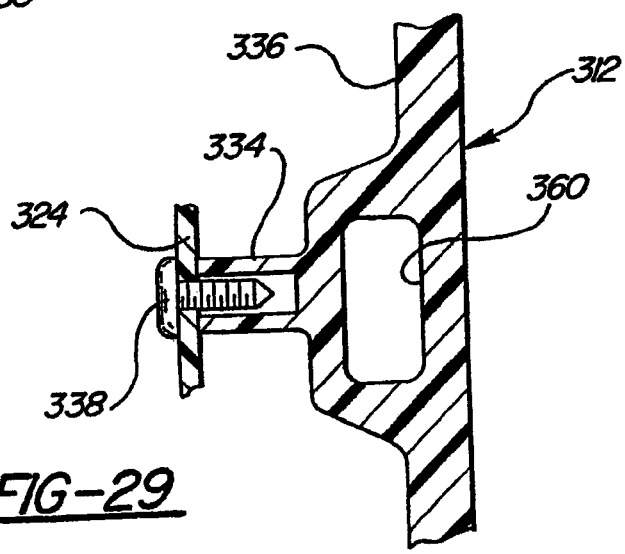
FIG. 29 is an enlarged partial cross-sectional view of an alternative boss construction.

Another inflatable restraint assembly embodiment, generally shown at 310 in FIGS. 25 and 26, includes a 360° tear seam 316 bounded by tubular channels 350. FIGS. 25, 26 and 28 show the assembly 310 installed in an automotive instrument panel and FIG. 27 shows an alternative embodiment 310' shown installed in an automotive door panel. FIG. 29 shows an alternative screw boss embodiment. Yet another inflatable restraint assembly embodiment, generally shown at 310" in FIG. 30, includes a 270° tear seam 316" bounded by tubular channels 350", 360". Reference numerals annotated with a prime symbol (') in FIG. 27 and with a double-prime symbol (") in FIG. 30 indicate alternative configurations of elements that also appear in the embodiment of FIGS. 25, 26 and 28. Where a portion of the description uses a reference numeral to refer to the figures, we intend that portion of the description to apply equally to elements designated by primed numerals in FIG. 27 and double-primed numerals in FIG. 30.

The assembly 310 comprises an air bag door generally indicated at 312 in FIG. 26. The air bag door 312 is integrally formed in a plastic trim panel retainer generally indicated at 314 in FIG. 26. The air bag door 312 and trim panel retainer 314 are formed together as a single unitary piece by injection molding. The weakened area or tear seam in the retainer, shown at 316 in FIGS. 25 and 26, defines at least a portion of the outline of the air bag door 312. The tear seam 316 is configured to help guide tearing and/or breakage under the force of air bag inflation. The tear seam 316 is formed in an inner surface of the retainer 314 to provide an air bag door 312 that is hidden from the view of vehicle occupants. In other embodiments, the tear seam 316 or a styling line may be included on an outer surface of the retainer portion 314.

An air bag canister, generally indicated at 318 in FIGS. 25 and 26, is supported behind the air bag door 312 and has a canister opening 320 directed toward and facing the air bag door 312. In a preferred embodiment, the canister 318 is an aluminum extrusion. A cover 319 with a center break 321 covers the canister opening 320. The cover 319 protects an air bag 322 stored in the canister 318. The configuration enables the air bag 322 to deploy through the door 312 from within the canister 318 when inflated in a known manner. The air bag door 312 is shaped to approximate the shape of the air bag canister opening 320 to preclude interference between the deploying air bag 322 and inner edges of the openings created in the retainer 314 when the air bag door 312 is forced open. The air bag 322 will at least initially retain the general shape of the canister opening 320 that the air bag 322 is deploying from. Therefore, the air bag 322 is less likely to get caught on the inner edges of the air bag door opening because the opening has the same shape as the canister opening 320.

Figure 35:
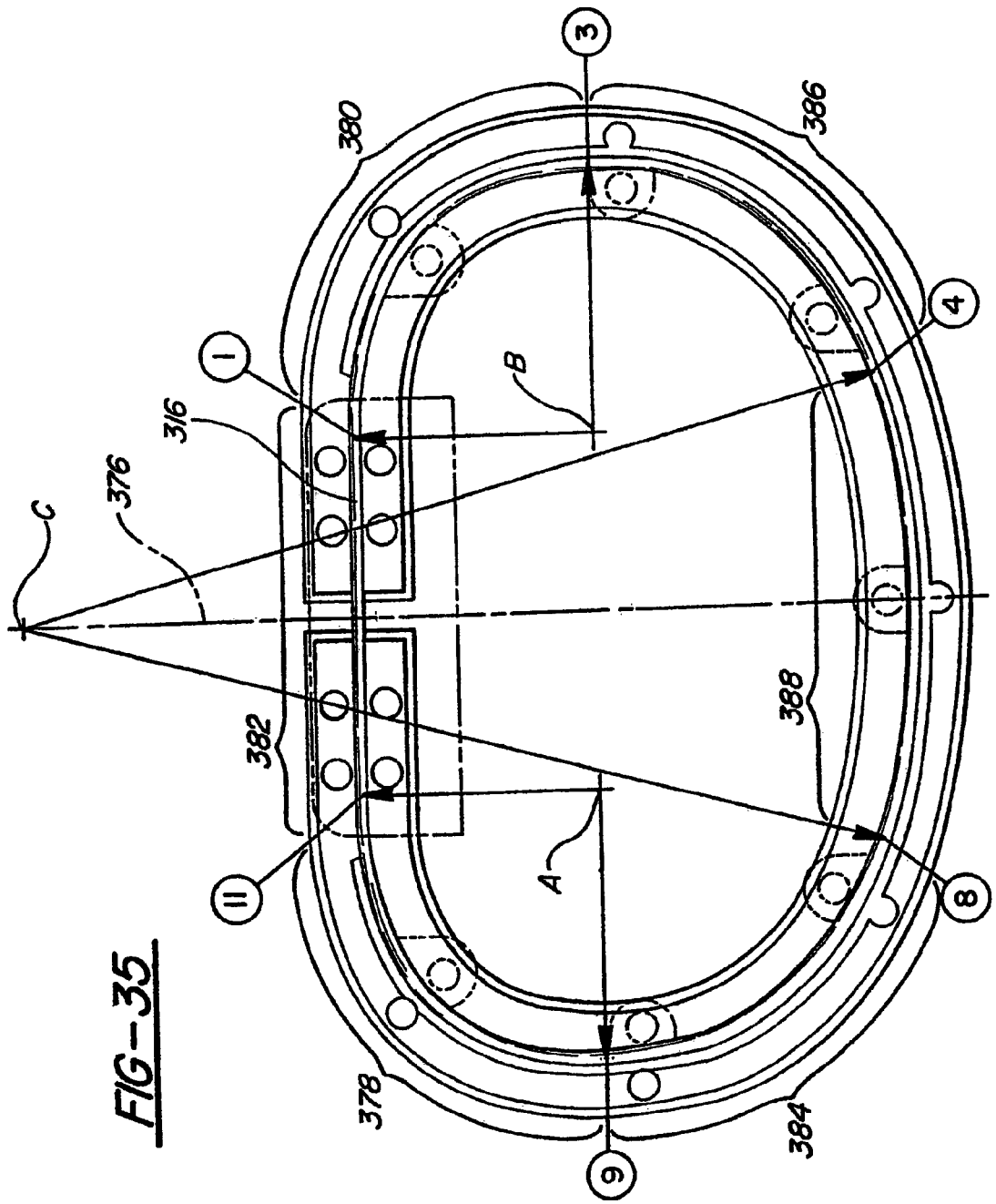
FIG. 35 is a die view of the tear seam pattern of the integral air bag door of FIG. 25.

The tear seam 316 partially defines an arcuate, cornerless shape for the air bag door 312 as shown in FIGS. 25 and 35. The tear seam 316 is formed by integral molding but may alternatively be formed by gas-assisted injection molding, machining using computer numerical control equipment (CNC), laser scoring and the like. The arcuate shape of the door 312 makes tear propagation more predictable by eliminating sharp corners that can be truncated during air bag deployment. In other words, as a crack forms along the tear seam during air bag deployment, rather than negotiate a corner, the crack tends to leave the tear seam and propagate across or "cut off" the corner. The severed corner may either remain attached to the surrounding material or may break free. More specifically, in the case of a rectangular shaped door, corners are "cut-off" and may fail to tear out when a tear seam fracture propagates horizontally outward from the center of a horizontal tear seam at the forward edge of the door, toward the lower corners of the door then leaves that tear seam and "cuts the corner" to an adjacent vertical tear seam instead of continuing to propagate along the horizontal tear seam and all the way around the corner to the vertical tear seam. Through experimentation it has been determined that a tear seam corner having a radius of 13 mm or less will typically fail, i.e., be "cut-off", in deployments at or below −40° F. It has also been found that corner having radii of 20 mm or greater will not fail—even at −40° F.

As best shown in FIG. 35, the tear seam 316 describes a symmetric arcuate path having a vertical line of symmetry shown at 376. The tear seam 316 is essentially cornerless. At no point along the tear seam 316 is there a curve having a radius less than 70 mm. In other words, no incremental length of the tear seam 316 has a curve defined by a radius of less than 70 mm. In other embodiments, any portion of any of the curves defining the tear seam 316 may be defined by radii of considerably less than 70 mm so long as they are not less than the 13 mm value at which tear seam curves have been found to fail at temperatures below −40° F. Optimally, to insure a margin of safety, no portion of any curve should be defined by a radius of less than 20 mm. Another way to express this is to say that, at no point along any curve defining the tear seam 316 should the rate of change of the slope of that curve be permitted to exceed that of a 20 mm diameter circle.

Upper left 378 and upper right 380 portions of the tear seam 316, extending between approximate 9 and 11 o'clock positions and between approximate 1 and 3 o'clock positions of the air bag door 312, respectively, are defined by respective curves that transition in radius from 70 mm at approximate 11 o'clock and 1 o'clock positions, respectively, to 78 mm at approximate 9 o'clock and 3 o'clock positions, respectively. The 70 mm radii, the 78 mm radii and all the transitional radii disposed between those radii are measured from a first center point A for the upper left portion 378 and a second center point B for the upper right portion 380 of the tear seam 316.

An upper mid portion 382 of the tear seam 316, extending between the approximate 11 and 1 o'clock positions, is defined by a generally straight line connecting the upper left 378 and upper right 380 portions of the tear seam 316.

Lower left 384 and lower right 386 portions of the tear seam 316, extending between the 8 and 9 o'clock positions and the 3 and 4 o'clock positions, respectively, are defined by respective curves that transition from a radius of 78 mm to a radius of 250 mm. The 78 mm radius is measured from center point A to the approximate 9 o'clock position for the lower left portion 384 and from center point B to the approximate 3 o'clock position of the door 312 seam for the lower right portion 386 of the tear seam 316. The 250 mm radius of the lower left portion 384 is measured from a third center point shown at C in FIG. 35 to an approximate 8 o'clock position of the tear seam 316. Point C is located 88 mm above the upper mid portion 382 of the tear seam 316 along the line of symmetry 376. The 250 mm radius of the lower right portion 386 is measured from the third center point C to an approximate 4 o'clock position of the tear seam 316. Between the 8 and 9 o'clock positions and the 3 and 4 o'clock positions, the lower left and lower right portions 384, 386 follow blend transition curves that are defined by radii that do not have a common center point. More specifically, the 8 and 9 o'clock positions and the 3 and 4 o'clock positions are connected by French curves.

A lower mid portion 388 of the tear seam 316, extending between the approximate 4 and 8 o'clock positions, is defined by curve of constant 250 mm radius from center point C.

As shown in FIG. 26, a steel reaction plate 324 is supported behind and is fastened to the air bag door 312, opposite an outer class-A surface 326 of the door 312. The reaction plate 324 is a flat sheet of metal having an arcuate shape generally matching that of the air bag door 312. At least a portion of an outer peripheral edge 328 of the reaction plate 324 is aligned adjacent the tear seam 316 to help distribute air bag deployment forces along the tear seam 316.

Alternatively, the reaction plate may include a perimeter edge treatment configured to further concentrate deployment forces along the tear seam.

The reaction plate 324 includes an integral metallic extension 330 or tether strap connected to the trim panel retainer 314 at a point adjacent the air bag door 312. The integral extension 330 serves as both a living hinge and a tether to the air bag door 312 during air bag deployment.

A pair of elongated tubular channels, shown at 350 in FIG. 26, are formed by gas assisted injection molding along either side of the tear seam 316 to further insure that tearing occurs only along the tear seam 316. The tubular channels 350 increase structural rigidity adjacent the tear seam 316 without requiring a large mass of material. Because the tubular channels 350 are hollow and do not require a relatively large concentration of material, their formation by injection molding does not result in distortions of the outer class-A surface 326 as would otherwise be the case.

As shown in FIG. 26, one of the tubular channels 350 is integrally formed along a peripheral outer edge of the door 312 and the other of the tubular channels 350 is integrally formed with a canister support bracket 352. The canister support bracket 352 is semi-circular in front view (not shown) to conform generally to exterior dimensions of a forward lower edge 354 of the canister 318.

The door 312 includes ribs 332 and bosses 334 integrally extending from a back surface 336 of the door 312 opposite the outer class-A surface 326. However, alternatively, the reaction plate 324 may include ribs extending integrally from an outer surface 313 of the reaction plate 324. (The FIG. 26 drawing is consistent with the ribs 332 extending either outward from the reaction plate 324 outer surface 313 or inward from the door 312 inner surface 336.) The reaction plate 324 is spaced from the back surface 336 by the ribs 332, bosses 334, and is fastened to the door 312 by fasteners 338 extending through the reaction plate 324 and into the bosses 334. Referring to FIG. 29 other embodiments may include tubular channels 360 integrally extending from the back surface 336 of the door 312 and/or the retainer 314 and supporting the bosses 334 which integrally extend inward from the tubular channels 360. A tether strap 330 and reaction plate 324 are attached to the bosses 334 by fasteners 338. One of the tubular channels 360 integrally extends 3600 around the peripheral edge of the door 312 to help guide tearing completely around the entire door 312 and thus allowing the door 312 to completely separate from the trim panel retainer 314. However, in other embodiments, the tubular channel 360 that is formed integrally with the door 312 may be formed only 270° with respect to the canister 318, i.e., at the sides and bottom of the canister opening. This is to concentrate the tearing forces at the side 316a, 316b and bottom 316c of the tear seam 316 and allow the door 312 to pivot around a living hinge formed at a junction of the retainer 314 and door 312 upon air bag inflation.

Referring to FIG. 25, the air bag canister opening 320 has the same arcuate, generally circular or oval shape as the air bag door 312 to help the stowed air bag 322 to fit through the opening left by the air bag door 312. However, because the air bag 322 expands as it deploys, the air bag door 312 is larger in area than the air bag canister opening 320.

A foam layer, as shown at 340 in FIG. 26, may be disposed on and adhered to an outer surface 341 of the retainer 314 and door 312. A skin or layer of cover material 342 is disposed over and adhered to an outer surface of the foam layer 340. In other embodiments, the outer surface 341 of the retainer 314 and door 312 may also be an outer class-A surface of the retainer 314 and door 312, i.e., in hard first surface IP applications having no foam or skin. In some cases, the skin will be weakened along the same outline as tear seam 316.

In the embodiment of FIGS. 25 and 26 the trim panel that includes the retainer 314 and door 312, is an instrument panel. However, in other embodiments, the inflatable restraint assembly may be configured to be mounted in a door panel as shown at 310' in FIG. 27, rather than an instrument panel as shown at 310 in FIG. 25. In the door panel, the assembly 310' acts as a side-impact-absorbing system.

Figure 30:
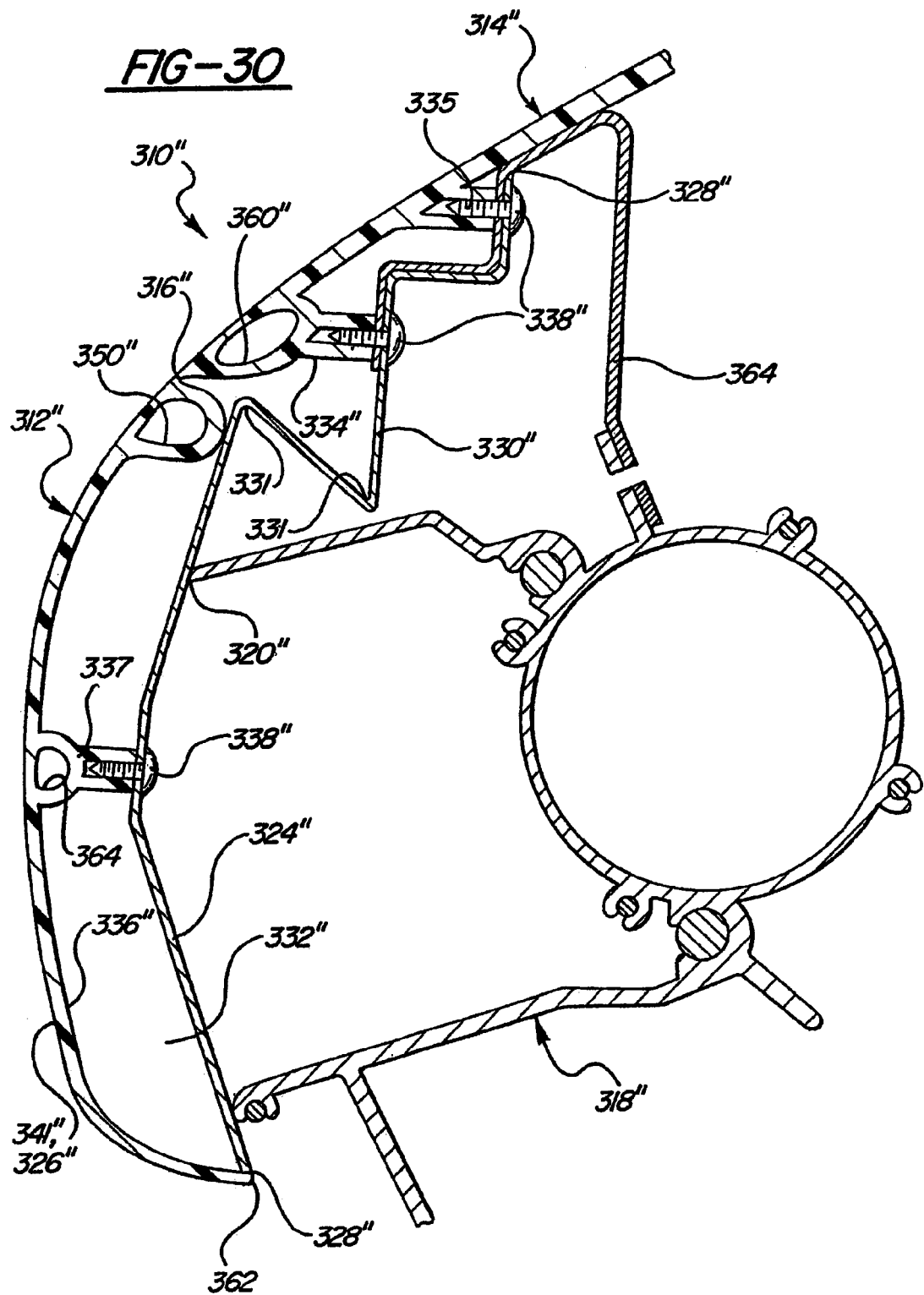
FIG. 30 is a side cross-sectional view of an air bag canister assembly constructed according to the invention and installed behind an instrument panel having an integral air bag door defined by a 270° tear seam.

According to the embodiment of FIG. 30, the canister opening 320" includes no cover 319. Instead, a reaction plate 324" is configured to dose the canister opening 320". The reaction plate 324" includes an integral extension or tether 330" having fanfolds 331 configured to allow the tether 330" to elongate when a deploying air bag forces the reaction plate 324" outward.

As with the embodiment of FIGS. 25, 26 and 28, the embodiment of FIG. 30 includes a pair of elongated tubular channels, shown at 350", 360" in FIG. 30. The tubular channels 350", 360" are formed by gas-assisted injection molding along either side of a tear seam 316" that defines an integrally formed door 312" in a retainer panel 314". As with the previous embodiments, the tubular channels 350", 360" are included to further insure that tearing is confined to the tear seam 316" when a deploying air bag forces the door 312" to open. As shown in FIG. 30, one of the pair of tubular channels 350" is integrally formed along a peripheral outer edge of the door 312" and the other of the pair of tubular channels 360" is integrally formed with the retainer 314" in which the door 312" is integrally formed. The tear seam 316" and the pair of tubular channels 350", 360" are formed around approximately 270° of the door 312", leaving a bottom edge 362 of the door 312 without any tubular channel or tear seam. The bottom edge 362 of the door 312 requires no tear seam as it is also a portion of a bottom edge of the retainer panel 314" and is unattached to any adjacent structures.

A screw boss 334" integrally extends inward from tubular channel 360" and provides one of two connecting points for the reaction plate tether 330" shown in FIG. 30. The second connecting point for the tether 330" is shown at screw boss 335 which integrally extends inward from the retainer 314". Screw bosses 334" and 335 also provide connecting points for an upper support bracket shown at 364 in FIG. 30. The embodiment of FIG. 30 also includes an additional tubular channel 364 that integrally extends from the inner surface 336" of the door 312". A third screw boss 337 integrally extends inward from tubular channel 364 and provides a connecting point for the reaction plate 324".

The description and drawings illustratively set forth our presently preferred invention embodiments. We intend the description and drawings to describe these embodiments and not to limit the scope of the invention. Obviously, it is possible to modify these embodiments while remaining within the scope of the following claims. Therefore, within the scope of the claims, one may practice the invention otherwise than as the description and drawings specifically show and describe.

What is claimed is:

1. An inflatable restraint assembly for an automotive vehicle, the apparatus comprising:
   a support structure;
   an air bag deployment door integrally formed in a vehicle panel, the air bag deployment door having a perimeter, at least a portion of the perimeter defined by a frangible marginal edge;
   an air bag canister supported adjacent a door inner surface opposite a door outer surface, the canister including a canister opening;
   an air bag supported in an air bag receptacle of the air bag canister, the air bag having an inner end operatively connected to the air bag canister and an outer end disposed adjacent the air bag deployment door, the air bag canister configured to direct air bag deployment along a deployment path through the vehicle panel;

a reaction plate disposed between the air bag and the air bag deployment door;

the reaction plate including a pivotable panel portion separate from the air bag door, and configured to pivot outward under the force of air bag inflation;

the reaction plate connected to the support structure; and a first tubular channel disposed along at least a portion of the air bag door perimeter.

2. An inflatable restraint assembly as defined in claim 1, in which the first tubular channel is disposed opposite an outer surface of the air bag door and vehicle panel.

3. An inflatable restraint assembly as defined in claim 1, further including a second tubular channel disposed adjacent and parallel to the first tubular channel, the door perimeter being disposed between the first and second tubular channels, one of the tubular channels being integrally formed with the door and the other tubular channel being integrally formed with the vehicle panel.

4. An inflatable restraint assembly as defined in claim 3 in which the frangible marginal edge is defined by an elongated gap defined by and disposed between the first and second tubular channels.

5. An inflatable restraint assembly as defined in claim 4 further including an elongated groove disposed in the door outer surface opposite the elongated gap.

6. An inflatable restraint assembly as defined in claim 1 in which the frangible marginal edge defines the entire air bag deployment door perimeter.

7. An inflatable restraint assembly as defined in claim 3 in which the frangible marginal edge and the first and second tubular channels are formed around approximately 270° of the air bag door.

8. An inflatable restraint assembly as defined in claim 1 in which a screw boss integrally extends inward from the tubular channel and is configured to receive a fastener connecting the reaction plate to the screw boss.

9. An inflatable restraint assembly as defined in claim 1 in which the tubular channel extends integrally inward from the inner surface of the door and a screw boss integrally extends inward from that tubular channel, the screw boss being configured to receive a fastener connecting the reaction plate to the screw boss.

10. An inflatable restraint assembly as defined in claim 1 in which the frangible marginal edge of the door comprises a region of reduced cross section.

11. An inflatable restraint assembly as defined in claim 1 in which the air bag deployment door includes a marginal edge that forms a hinge between the vehicle panel and the door.

12. An inflatable restraint assembly as defined in claim 11 in which:

the door and panel comprise a first material; and the hinge includes a hinge panel comprising a second material embedded at least partially within the first material and spanning the door perimeter.

13. An inflatable restraint assembly as defined in claim 12 in which the hinge panel includes:

a first end embedded in a portion of the first material that forms the door;

a second end embedded in a portion of the first material that forms the vehicle panel; and a mid portion disposed between the first and second ends, the mid portion having an outer surface thereof covered with a portion of the first material that forms the outer surface of the air bag door and vehicle panel, the mid portion having an exposed inner surface disposed opposite the outer surface thereof.

14. An inflatable restraint assembly as defined in claim 12 in which the second material is selected from the group consisting of thermoplastic rubber, glass matte, fabric and metal.

15. An inflatable restraint assembly as defined in claim 11 in which the hinge is invisible on an outer surface of the vehicle panel.

16. An inflatable restraint assembly as defined in claim 1 in which a flexible skin covers at least a portion of the vehicle panel in a layered disposition.

17. An inflatable restraint assembly as defined in claim 1 in which a foam layer covers at least a portion of the vehicle panel.

18. An inflatable restraint assembly as defined in claim 1 in which:

the perimeter of the air bag door is generally shaped to approximate the shape of the air bag canister opening; and the frangible marginal edge at least partially defines an arcuate shape for the air bag door.

19. An inflatable restraint assembly as defined in claim 18 in which the air bag canister opening has the same general arcuate shape as the air bag door.

20. An inflatable restraint assembly for an automotive vehicle, the apparatus comprising:

a support structure;

an air bag deployment door integrally formed in a vehicle panel, the air bag deployment door having a perimeter, at least a portion of the perimeter defined by a frangible marginal edge;

an air bag dispenser supported adjacent a door inner surface opposite a door outer surface;

an air bag supported in an air bag receptacle of the air bag dispenser, the air bag having an inner end operatively connected to the air bag dispenser and an outer end disposed adjacent the air bag deployment door, the air bag dispenser configured to direct air bag deployment along a deployment path through the vehicle panel;

a reaction plate disposed between the air bag and the air bag deployment door;

the reaction plate including a pivotable panel portion configured to pivot outward under the force of air bag inflation;

the reaction plate connected to the support structure; and at least one rib extending integrally inward from the door inner surface towards the reaction plate.

* * * * *